United States Patent [19]

Ekanadham et al.

[11] Patent Number: 5,745,781
[45] Date of Patent: Apr. 28, 1998

[54] MEMORYLESS COMMUNICATIONS ADAPTER INCLUDING QUEUEING AND MATCHING PRIMITIVES FOR SCALABLE DISTRIBUTED PARALLEL COMPUTER SYSTEMS

[75] Inventors: Kattamuri Ekanadham, Yorktown Heights; Hubertus Franke, Croton-on-Hudson, both of N.Y.; Douglas James Joseph, New Fairfield, Conn.; Pratap Pattnaik, Ossining; Marc Snir, Briarcliff Manor, both of N.Y.

[73] Assignee: International Business Machines Corporation, Armonk, N.Y.

Related U.S. Application Data

[60] Provisional application No. 60/009,234, Dec. 26, 1995.

[21] Appl. No.: 598,931

[22] Filed: Feb. 9, 1996

[51] Int. Cl.[6] .......................................... G06F 3/00
[52] U.S. Cl. .......................... 395/800.29; 395/859
[58] Field of Search ....................... 395/800, 872, 395/874, 876, 859, 825, 497.01, 200.07, 200.1, 680, 606, 800.29

[56] References Cited

U.S. PATENT DOCUMENTS

| | | | |
|---|---|---|---|
| 5,133,053 | 7/1992 | Johnson | 395/200 |
| 5,386,566 | 1/1995 | Hamanaka | 395/700 |
| 5,448,702 | 9/1995 | Garcia | 395/325 |
| 5,611,046 | 3/1997 | Russell | 395/200.1 |
| 5,623,628 | 4/1997 | Brayton | 395/468 |
| 5,655,146 | 8/1997 | Baum | 395/825 |

*Primary Examiner*—Eric Coleman
*Attorney, Agent, or Firm*—Kevin M. Jordan

[57] ABSTRACT

A memoryless communications adapter for communicating between the nodes of a distributed parallel computer network, each node including a non-shared program memory coupled to the memoryless communications adapter which interfaces the network. An embodiment of the present invention advantageously provides an adapter that can manipulate queues and matching tables efficiently in hardware and provide a high-level object view of queues and matching in the context of communication between nodes. Preferably, the Queue manipulation logic, Match Table manipulation logic and the Sequence Table manipulation logic are implemented in the adapter hardware which does not keep any state or resources in it that depend on the size of the system or the number of queues/tables instantiated. The actual states of these objects may be kept in the program memory, so that the adapter hardware is memoryless.

12 Claims, 17 Drawing Sheets

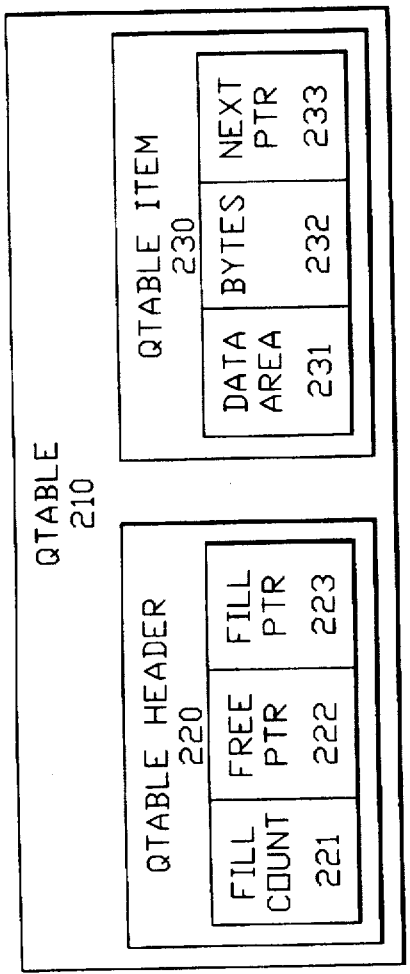
FIG.3
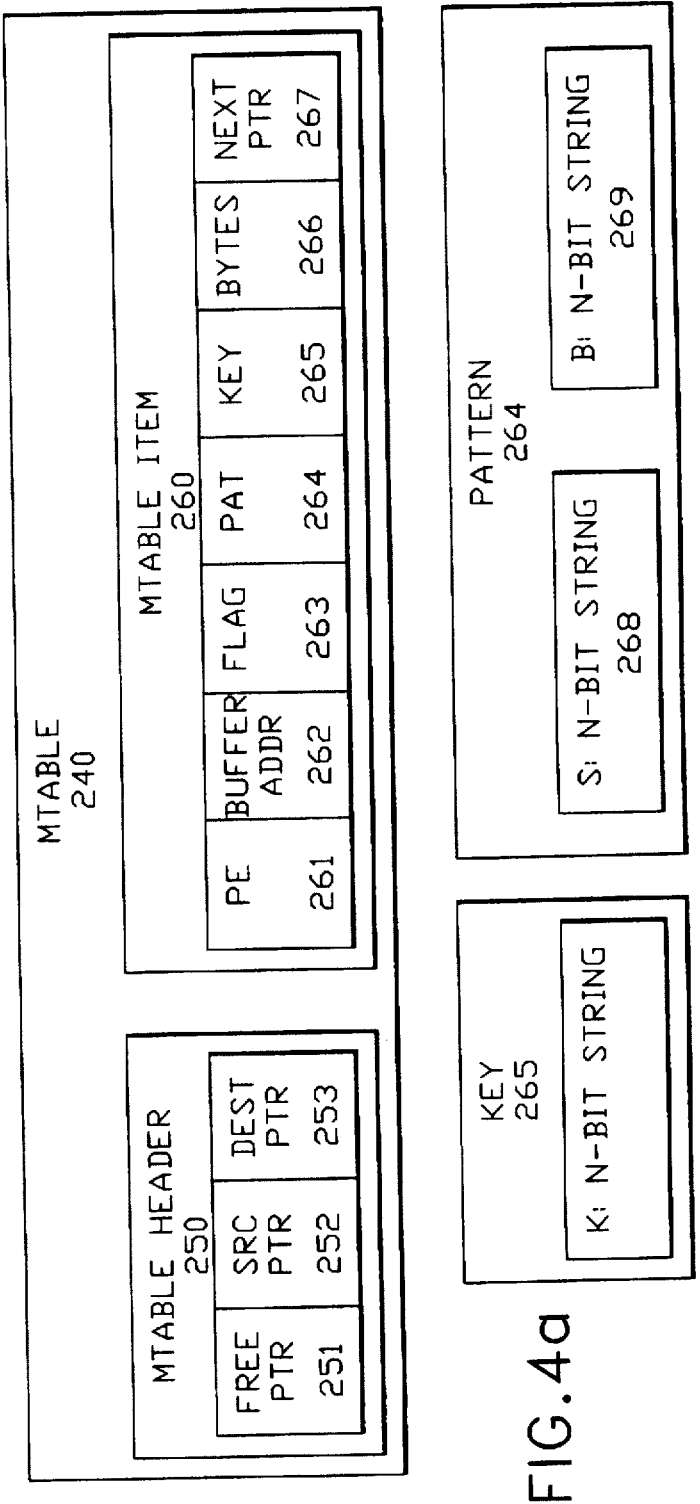
FIG.4
FIG.4a

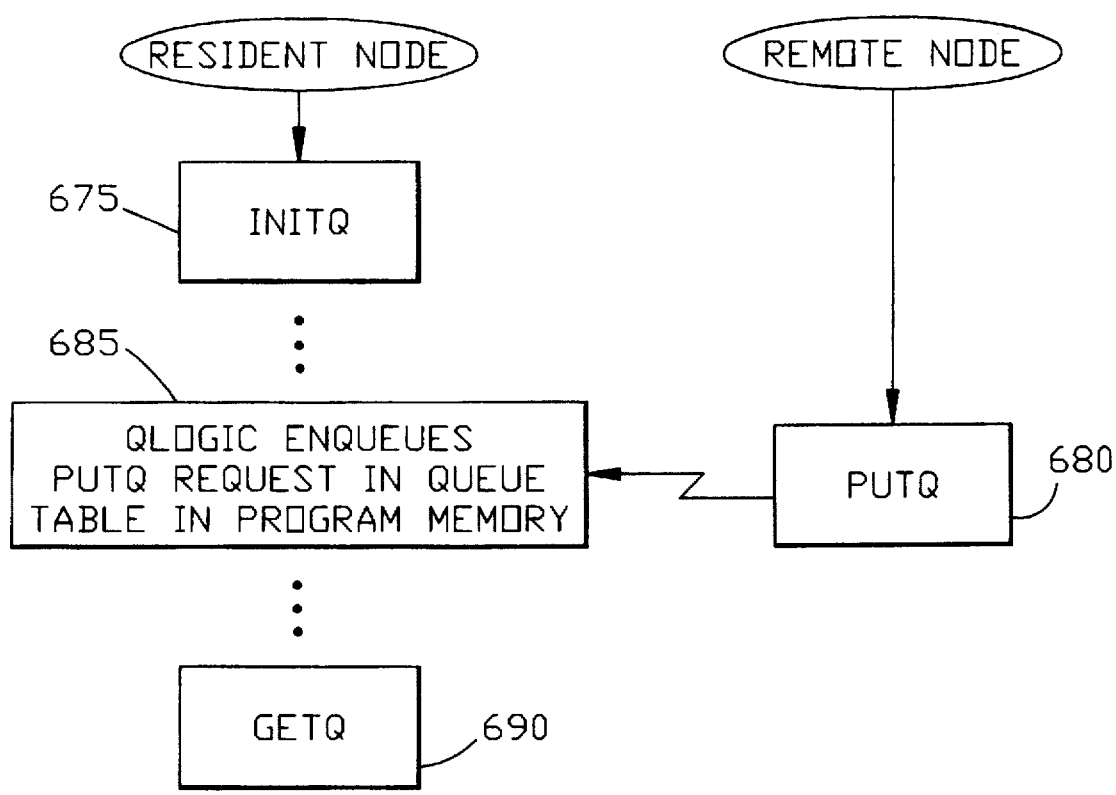

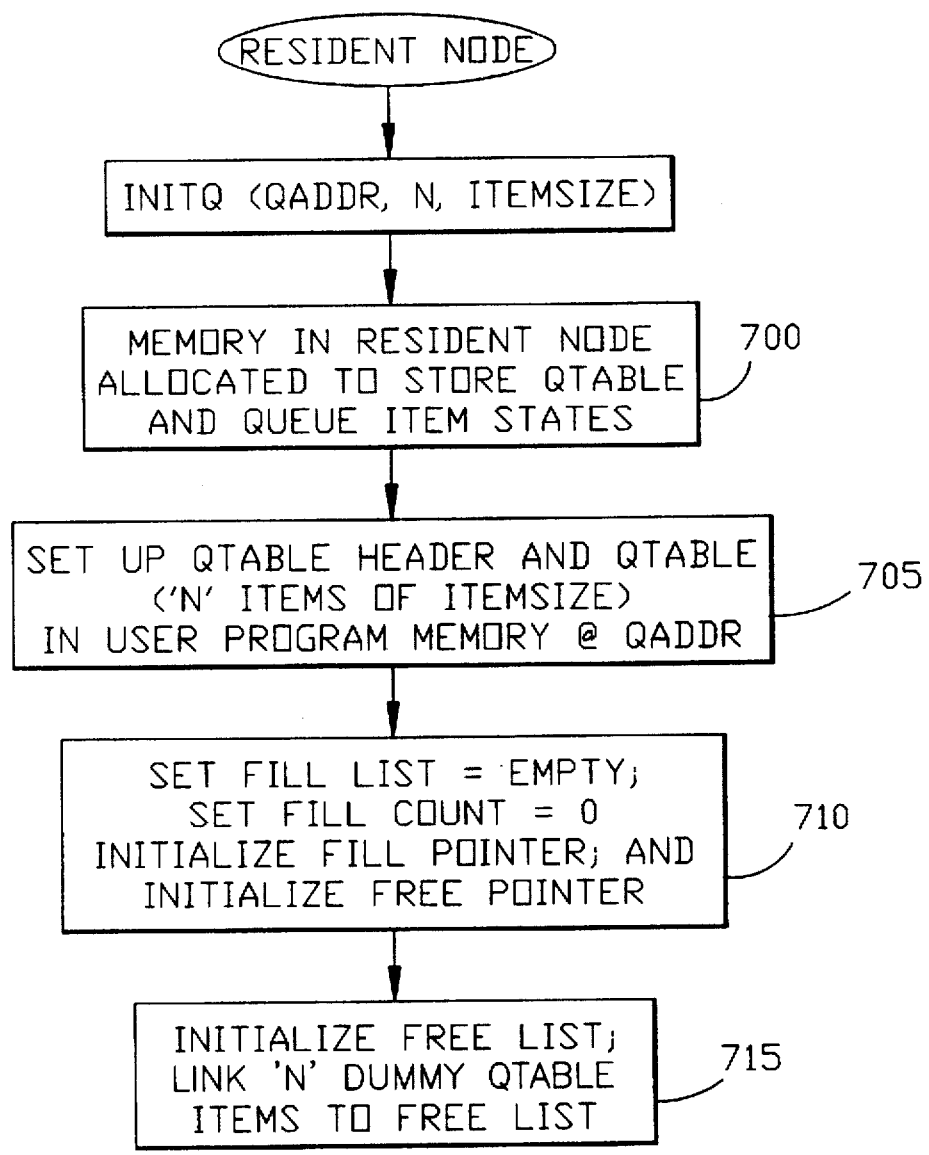

MEMORYLESS COMMUNICATIONS ADAPTER INCLUDING QUEUEING AND MATCHING PRIMITIVES FOR SCALABLE DISTRIBUTED PARALLEL COMPUTER SYSTEMS

CROSS-REFERENCE TO RELATED APPLICATIONS

The present application claims priority to co-pending U.S. provisional application Ser. No. 60/009,234 filed Dec. 26, 1995.

FIELD OF THE INVENTION

This invention is related to parallel computer systems that provide a distributed memory model and in particular to the design of a communications adapter in each node that acts as an interface between the processor and the network.

BACKGROUND ART

A typical scalable parallel distributed system consists of many identical nodes connected together by a high-speed network. A node typically consists of a processor, its memory and an adapter that interfaces with the network. Both the processor and the adapter can access the memory inside the node. But they cannot access memory in other nodes. Explicit network communication must be used for any data transfer between nodes. The processor is the main computing engine in a node. It executes the program supplied by a programmer. Some of the instructions in the program may be to send or receive data from other processors. To accomplish this, the processor instructs the adapter to do several things and the design of those primitives is the subject matter of this invention. The program that is running on a processor is referred to as a process. An adapter is a hardware device that is interposed between the processor and the network. It receives communication commands from the processor and transfers specified data between the processor's memory and the network. It also receives data from the network, stores them in appropriate places in the memory and notifies the processor.

In message passing systems, communication between two nodes takes place after both sides issue matching commands. Commands are matched based on certain characteristics of the command parameters, which are established by the software. Until the matching criteria are satisfied, messages received at a node must be buffered, queued and organized to be matched in a certain order. The queueing and matching criteria vary from system to system and there is a variety of messaging protocols in the application domain. Earlier adapter designs [e.g. the adapter in IBM SP2 machine] take a minimalist approach and push all the queueing and matching services into the software. See "THE COMMUNICATION SOFTWARE AND PARALLEL ENVIRONMENT OF THE IBM SP2", IBM Systems Journal, June 1995. One drawback to such an approach is the increased software overheads. Furthermore, the matching is tailored to the specific message passing primitive library being implemented. Clearly, a need exists for a more general purpose matching function that enables users to compose their own matching criteria.

Another approach has been implement an entire protocol (such as MPI) in the adapter hardware to achieve good performance. Such an approach suffers from inflexibilities as particular protocol policies are buried in hardwired logic and they cannot adapt to dynamically changing protocols.

More recently, adapter designs (e.g. see K. Hayashi et al., "AP1000+: Architectural Support of PUT/GET Interface for Parallelizing Compiler", ASPLOS VI October 1994) provide a primitive functional layer using get/put primitives in the adapter. This facilitates RMC (remote memory copy) based shared memory systems. Incorporation of get/put primitives alone into the adapter, however, does not reduce the software burden substantially. For message passing applications, in particular, efficient implementation of send/receive primitives is vital. This requires the queueing of messages and matching them based on tags specified by the user. Implementing the needed queueing and matching operations in software is quite expensive (ie. causes long latencies). Furthermore get/put operations are passive in the sense that data transfer is unilateral and they do not provide direct activation of complementary actions at the other end. The remote node must explicitly poll the state to determine when the data transfers took place. This is particularly troublesome when matching operations are to be performed. For instance, if send and receive operations are implemented using only passive put primitives, an agent must actively poll the tables in which the requests are deposited and match them to take appropriate actions for data transfer. This precludes opportunities for overlapping data transfers with other computations.

FIG. 1 shows an overview of a typical prior art distributed parallel system, in which many identical nodes 100 are connected together by a high speed network 550. Each node 100 includes a processor 300 running a process 500, an adapter 400, and a memory 200. The processor 300 and the adapter 400 can access the memory via a bus 101 and the processor 300 can issue commands to the adapter via a memory mapped interface 600. An example of such a system is the IBM scalable POWERparallel System 9076 SP2. Preferably, the adapter 400 implements put/get primitives that enable a process in one node to directly write into the memory of a process in another node, by specifying the source and destination addresses. This implies that adapter is capable of interpreting the addresses supplied by the user programs in a manner consistent with their interpretation by the processors.

Efficient hardware implementation of queues is an important problem and has been studied in the literature. For example, U.S. Pat. No. 5,386,514, by Richard Larry et al., "Queue Apparatus and Mechanics for a Communications Interface Architecture", Issued on Jan. 31, 1995, describes an efficient implementation of a FIFO queue (using singly linked lists), between a port driver (a portion of the OS software) and a hardware port adapter. The adapter receives data from network and enters it in the queue and the port driver reads and deletes these data items from the queue. These activities proceed concurrently and without any need for synchronization support. When the queues may be accessed by many concurrent threads running in the node (as in a distributed parallel environment), more sophisticated mechanisms are needed to do the queueing.

The notion of matching is well-known in dataflow architectures, e.g. see Arthur H. Veen, "Dataflow Machine Architecture", ACM Computing Surveys 18, No. 4, December 1986. Typically, tokens come with tags and a hardware mechanism matches the tags and stores them if necessary. This tag matching is a simple equality and the action on matching is to purge the entry from the matching table and deliver the pair to a processor. The matching in message passing is more complex and involves several don't-care conditions and combinations of fields. More sophisticated hardware is required to do such generalized matching.

There are several patents related to different aspects of communications adapters, e.g. Paul Chang et al., "Generic High Bandwidth adapter having data packet memory configured in three level hierarchy for temporary storage of variable length data packets", U.S. Pat. No. 5,367,643, Issued on Nov. 22, 1994; John Wishneusky et al., "Multi-Channel Data Communications Controller", U.S. Pat. No. 4,975,828, Issued on Dec. 4, 1990; and Jeffrey Swarts et al., "Micro Channel Interface Controller", U.S. Pat. No. 5,379,386, Issued on Jan. 3, 1995. Each of the aforementioned patents has a different function and result than the present invention. Chang describes a high bandwidth adapter for the efficient transfer of packets from a network into a processor. It does not deal with the high level functionality with which programs handle these messages. Wishneusky and Swarts disclose controllers that efficiently transfer data between the network and memory. They are programmable for enforcing specific policies, but do not deal with high-level functionality of message handling. Parallel Systems have several aspects to them. For example the U.S. patent by Murthy Devarakonda, "Distributed Lock Manager Using a Passive State-full control server", U.S. Pat. No. 5,454,108, issued on Sep. 26, 1995, describes a mechanism for a distributed lock manager to deal with shared files. They are not relevant to the problem of an efficient message passing facility in distributed systems.

With the advent of massively parallel systems, the design of a proper communication adapter that connects each node processor to the network becomes important. More and more functionality can be pushed into the hardware adapter, making it expensive in terms of hardware design while reducing flexibility to adapt to changing environments. But a lean adapter (hardware) which forces the functionality into the software introduces attendant latencies. Thus, there is a need for an adapter which advantageously provides:

1. The generality that no policy is hardwired into it and at the same time provide a flexible interface for a variety of functions;
2. The most frequently used functions so that software overheads to implement them can be avoided; and
3. Scalableness, so that the adapter hardware has no resources or state that is proportional to the size of the system.

Our invention advantageously provides an adapter that can manipulate queues and matching tables efficiently in hardware and provide a high-level object view of queues and matching in the context of communication between nodes.

The improvements, which this invention achieves, are: the ability for user programs to instantiate multiple communication queues, an ability for the user program to deposit and retrieve messages into/out of an instantiated queue, the ability for user programs to instantiate multiple matching tables an ability for the user program to deposit and retrieve messages into/out of an instantiated match table, with very general user-defined specification of matching criteria, sequencing of messages between a node and a target queue or match table and all the above are accomplished by a scalable adapter hardware that does not keep any state or resources in it that depend on the size of the system or the number of queues/tables instantiated.

These improvements are accomplished by providing:

the Queue manipulation logic, Match Table manipulation logic and the Sequence Table manipulation logic in the adapter hardware; and by keeping the actual states of these objects in the program memory, so that the adapter hardware is completely memoryless.

According to an embodiment of the present invention, in a distributed parallel computer network including a plurality of nodes, each node including a non-shared program memory coupled to a memoryless communications adapter which interfaces the network, a communications adapter-based method for communicating between the nodes comprises the following steps:

executing a process in parallel on a plurality of the nodes; issuing a queue table initialization request from the process in a resident node to a queue logic incorporated in hardware of the memoryless communications adapter in the resident node and the queue logic instantiating, responsive to the queue table initialization request, a queue table for storing a plurality of data identifiers in the program memory of the resident node; communicating a put queue request which includes a data identifier from the queue logic in a remote node to the queue logic in the resident node, and remotely copying, responsive to the put queue request, a data item associated with the put queue request from the program memory in the remote node to the queue table; and issuing a get queue request from the process in a resident node to the queue logic in the resident node and the queue logic in the resident node retrieving the data item associated with the get queue request from the queue table.

According to another embodiment of the present invention, in a distributed parallel computer network including a plurality of nodes, each node including a non-shared program memory coupled to a memoryless communications adapter which interfaces the network, a communications adapter-based method for communicating between the nodes, comprises the following steps: executing a process in parallel on a plurality of the nodes; issuing a match table initialization request from the process in a resident node to a match logic incorporated in hardware of the memoryless communications adapter in the resident node and the match logic instantiating, responsive to the match table initialization request, a match table for storing a plurality of data identifiers in the program memory of the resident node; communicating a put match request which includes a data identifier and a key from the match logic in a remote node to the match logic in the resident node, and the match logic in the resident node searching the match table for a matching data identifier as a function of the key; when the step of searching the match table is successful, remotely copying data associated with the data identifier from the program memory in the remote node to the program memory in the resident node; when the step of searching the match table is unsuccessful, storing the data identifier and the key in the match table.

BRIEF DESCRIPTION OF THE DRAWINGS

These and other objects, features, and advantages of the present invention will become apparent from the following detailed description, appended claims and accompanying drawings, wherein:

FIG. 3 shows an embodiment of a queue table structure according to the present invention;

FIG. 4 shows an embodiment of a match table structure according to the present invention;

FIG. 4a shows an embodiment of key and pattern structures referenced in FIG. 4;

FIG. 6a shows an embodiment according to the present invention of a dataflow and function for a queue logic implemented in the adapter hardware;

FIG. 6b shows an embodiment of a dataflow and function according to the present invention for a queue initialization (initq) primitive incorporated in the queue logic of the adapter hardware;

DETAILED DESCRIPTION

Figure 1:
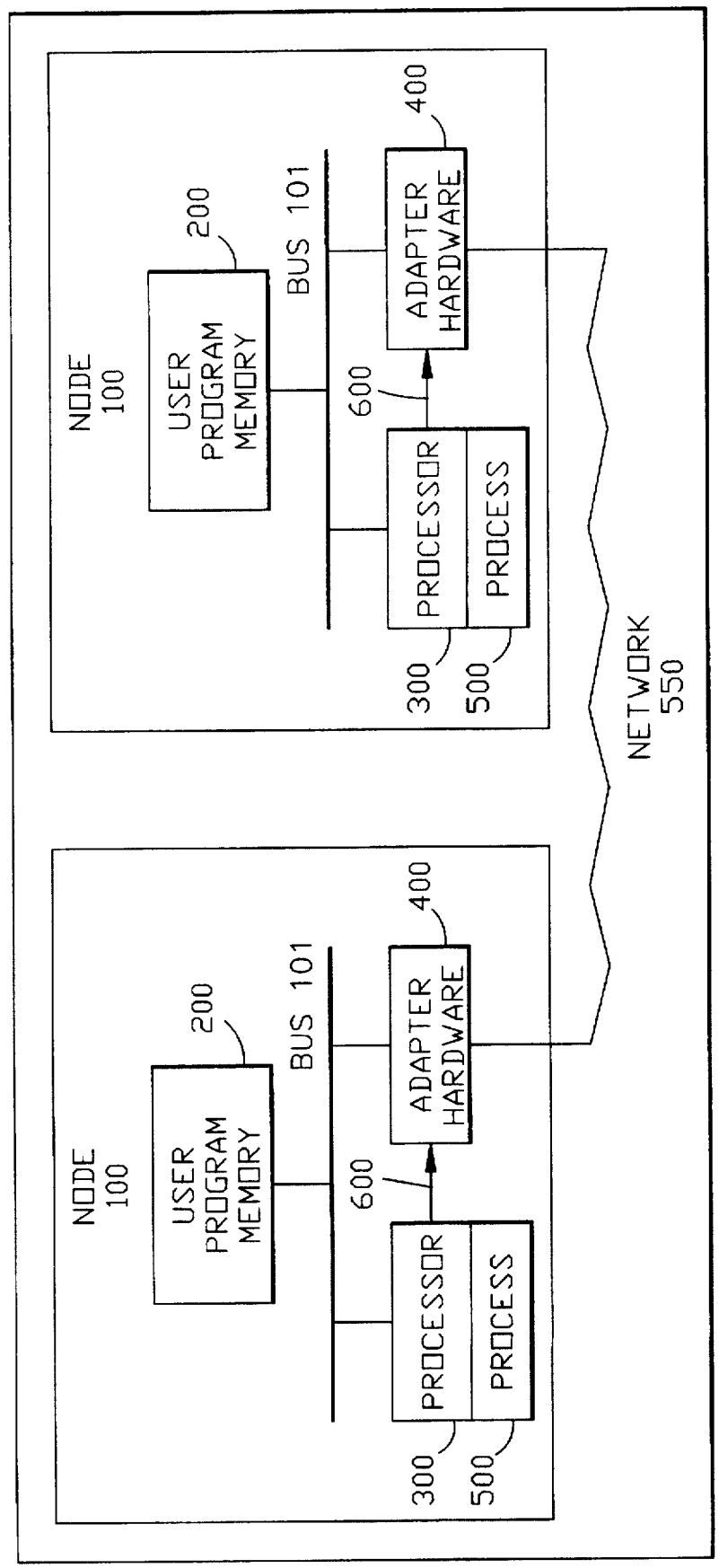
FIG. 1 shows a prior art distributed parallel system.
Figure 2:
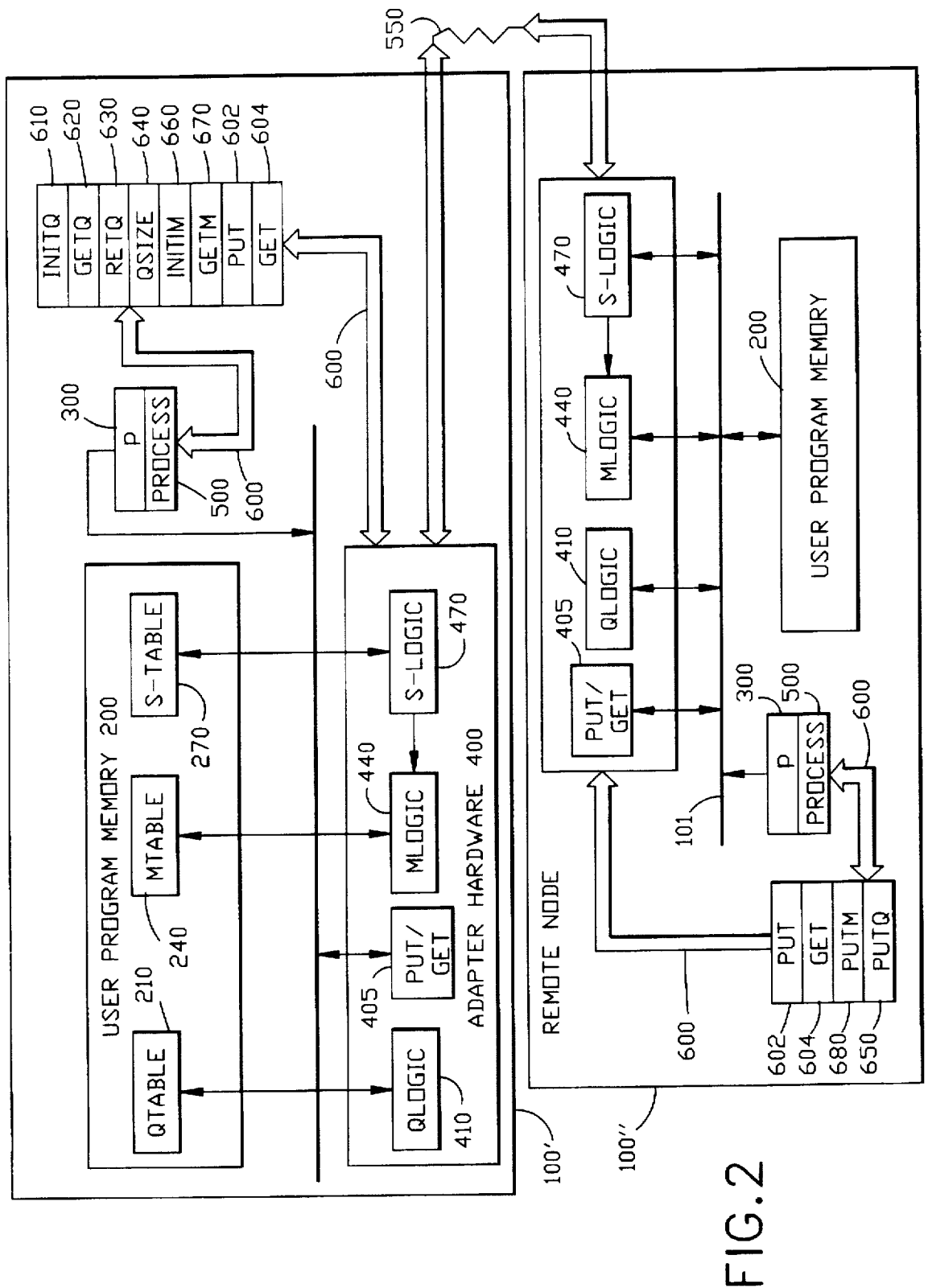
FIG. 2 shows a distributed parallel system including an embodiment of a memoryless communications adapter according to the present invention.

Referring to FIG. 2, a distributed parallel system including an embodiment of a memoryless communications adapter 400 according to the present invention is shown. Many identical nodes 100 are connected together by a high speed network 550. Each node 100 includes: a processor 300 running a process (or program) 500 in parallel across a plurality of nodes; the memoryless communications adapter 400 according to the present invention, and a user program memory 200. The processor 300 and the adapter 400 can access the program memory 200 via a bus 101 and the processor 300 can issue commands 610–670 to the adapter via the memory mapped interface 600. Preferably, the adapter 400 implements put/get primitives 405 that enable a process 500 in one node to directly write into or copy from the memory of a process in another node, by specifying a put 602 or get 604 command which includes the source and destination memory addresses.

In a distributed process 500, several components of the process (or program) 500 execute in parallel on one or many nodes 100. The nodes communicate with each other and together accomplish the desired result of the process 500. According to an embodiment of the present invention, the inter-communication involves queues and sophisticated ways of selecting items from the queues. Hereinafter, each component of a process 500 is referred to as either a service process or client process, depending upon whether it is respectively processing a request or submitting a request. Those skilled in the art will realize that since these components run in parallel, the sequences of steps described in the system, apparatus, and methods described below are taking place asynchronously.

The program memory 200 includes a qtable 210 for each queue table instantiated, an mtable 240 for each match table instantiated and an s-table 270 for each sequencing table instantiated.

Each of the table structures preferably reside in the memory 200 at the node 100 from which a process 500 instantiates them. This is called the resident node 100'. The processor at the resident node 100' may issue any of the operations: initq 610 (to the qlogic 410 for instantiating a queue table); initm 660 (to the mlogic 440 for instantiating a match table, or to the slogic 470 and mlogic 470 if a sequence table is specified); getq 620 (to qlogic 410 for retrieving a message from the queue table); getm 670 (to mlogic 440 for retrieving a matching message from the match table); retq 630 (to qlogic 410 for unlinking a message from the queue table); and qsize 640 (to qlogic 410 for determining the size of a queue table).

The associated processors for a given parallel process executing at other nodes, called remote nodes 100" may communicate the following operations to their respective resident nodes 100': a putq 650 operation (to the qlogic 410 for placing a message in the queue table); or a putm 680 operation (to the mlogic 440 for placing a matching message in the match table, or to the slogic 470 and mlogic 400 for placing a sequential message in the sequence table).

Note that preferably, the communications adapter 400 hardware embodies the aforementioned logic mechanisms called the qlogic 410, the mlogic 440 and the slogic 470 which manipulate the associated tables when a command, e.g., getq 620 is received. The tables may encode the entire state of a table so that the qlogic 410, mlogic 440, and the s-logic 470 is memory-less. These features of the present invention advantageously optimize performance and flexibility while providing scalability as the system expands.

Figure 2A:
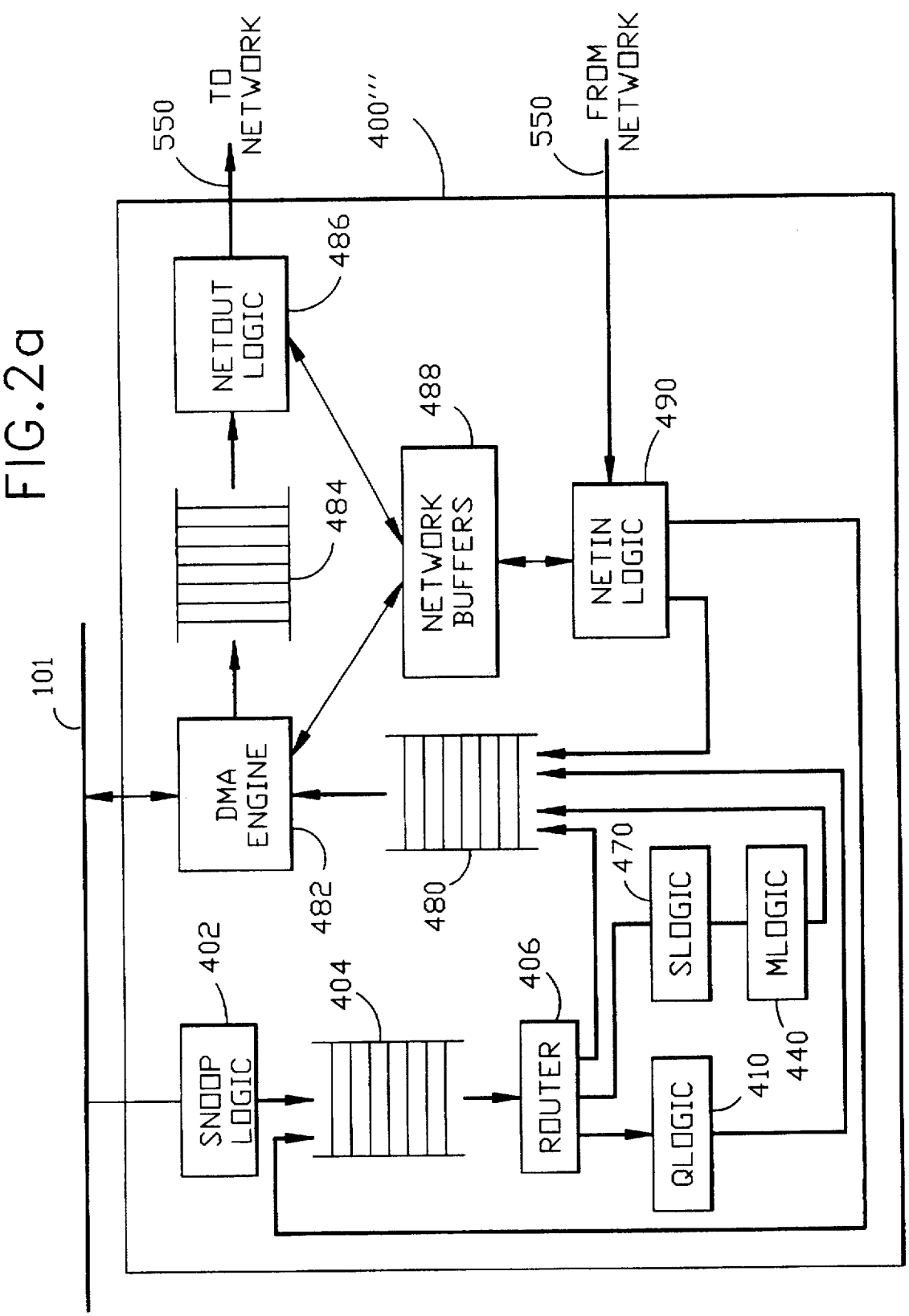
FIG. 2a shows an embodiment of a memoryless communications adapter according to the present invention.

Referring now to FIG. 2a, an embodiment of a memory-less communications adapter according to the present invention is shown. The adapter 400''' preferably includes a snoop logic 402 mechanism, well known in the art, communicatively coupled to the bus 101. The snoop logic monitors the bus 101 and captures operations issued by the local processor that are relevant to the adapter 400''' and constructs the commands 602–680 therefrom. The commands may be put into an input queue 404, well known in the art, coupled to the snoop logic 402. In parallel, a router logic 406, well known in the art, mechanism, polls the input queue 404, removing the commands and routing them to the appropriate logic. If the command is a get 604 or a put 602 they may be placed directly in a DMA command queue 480 coupled to the router 406. Otherwise, the commands 610–680 are routed to the associated qlogic 410, slogic 440, and/or mlogic 470 incorporated in the adapter hardware. Embodiments of the qlogic 410, slogic 440, and/or mlogic 470 according to the present invention will be described later. A direct memory access or DMA engine 482 also has: a bidirectional connection to the bus 101; an input coupled to the DMA command queue 480; an output coupled to NetOut logic 486 via outgoing packet queue 484, and a bidirectional connection to the NetOut logic 486 via network buffers 488. The DMA engine 482 handles the bidirectional transfer of data with memory 200 and network buffers 488. The DMA engine preferably creates control blocks for outgoing communications packets and places them into the outgoing packet queue. The NetOut logic 486 takes each item from the packet queue 484 and transfers the corresponding data from network buffers 488 to the network 550. The adapter also includes NetIn logic 490 having an input coupled to the network 550 for receiving and storing incoming network packets into the Network buffers 488. The NetIn logic 490 has outputs coupled to the DMA command queue 480 and the input queue 404. The NetIn logic 490 constructs the commands 602–680 from the incoming network packets and puts them the appropriate queue. If the command is a get 604 or a put 602 they may be placed directly in the DMA command queue 480. Otherwise, the commands may be put into the input queue 404 for processing by router logic 406, as described previously.

Queues are used to correlate requests generated by one or more client processes (on one or more remote nodes 100") to a service process (on a resident node 100'). FIG. 3 shows an embodiment of a queue table structure according to the present invention. An embodiment according to the present invention of a dataflow and function for the qlogic 410 implemented in the adapter hardware 400 will be described later with reference to FIGS. 6a–6f. Referring now to FIG. 3, a qtable 210 may include a qtable header 220 and a linked list(s) of qtable items 230. A qtable header 220 may include: a fill count 221 which tracks the number of filled entries in the queue; a free ptr 222 which points to the first item in a free linked list of qtable items 230; and a fill ptr 223 which points to the first item in a filled linked list of qtable items 230. Each qtable item 230 may include a data area 231 sent by a process the number of bytes 232 occupied by the item and a pointer to the next item 233 in the linked list.

FIG. 4 shows an embodiment of a match table (mtable 240) structure according to the present invention. An embodiment according to the present invention of a dataflow and function for the mlogic 440 and associated slogic 470 implemented in the adapter hardware 400 will be described later with reference to FIGS. 7a–7g. Referring now to FIG. 4, the mtable 240 preferably includes an mtable header 250 and a linked list(s) of mtable items 260. The mtable header 250 includes: a free ptr 251 which points to the first item in a free list of mtable items 260; a src ptr 252 which points to the first item on a source (src) list of mtable items 260; and a dest ptr 253 which points to the first item in a destination (dest) list of mtable items 260. Each mtable item 260 includes a processor (pe) number 261, the buffer address 262, a return status flag 263, a pattern 264, a key 265, the number of bytes 266 in the buffer, and a pointer to the next item, next ptr 267 in the linked list.

FIG. 4a shows an embodiment of key and pattern structures referenced in FIG. 4. Preferably, a key 265 is an n-bit string, where n is some system-wide constant. A pattern 264 may consist of a target key 268 and a mask 269. A key K, may be said to match a pattern (S,B) if and only if for i=1 ... n, either the i-th bit of B is 0 or i-th bits in K and S are equal.

Figure 5:
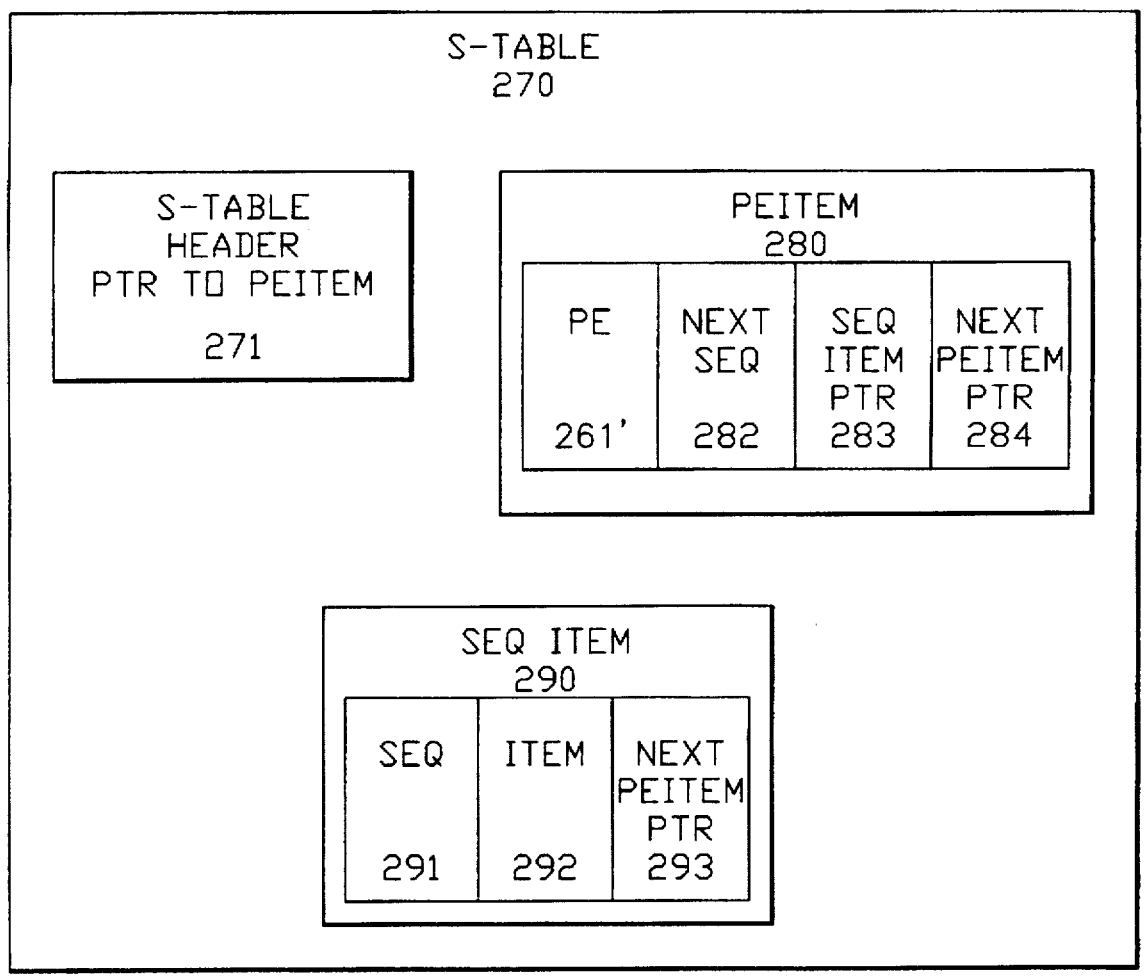
FIG. 5 shows an embodiment of a sequence table structure according to the present invention.

FIG. 5 shows an embodiment of a sequence table (s-table 270) structure according to the present invention. S-table 270 may include an s-table header 271 which is a pointer to a peitem 280. A peitem 280 preferably includes: the pe number 261' which identifies the processor associated with a given item; the next sequence number expected (next seq 282) expected from pe 261'; a sequential item pointer (seq item ptr 283) which points to the first item on a linked list of sequentially ordered items (seq items 290) for pe 261'; and a pointer (next peitem ptr 284) to the next peitem 280 in the linked list. Each seq item 290 preferably includes: a sequence number (seq number 291) which may be used to order the seq items; an item 292, e.g., message supplied by the process; and a next item ptr 293 pointing to the next item on the linked list of seq items 290.

Figure 6C:
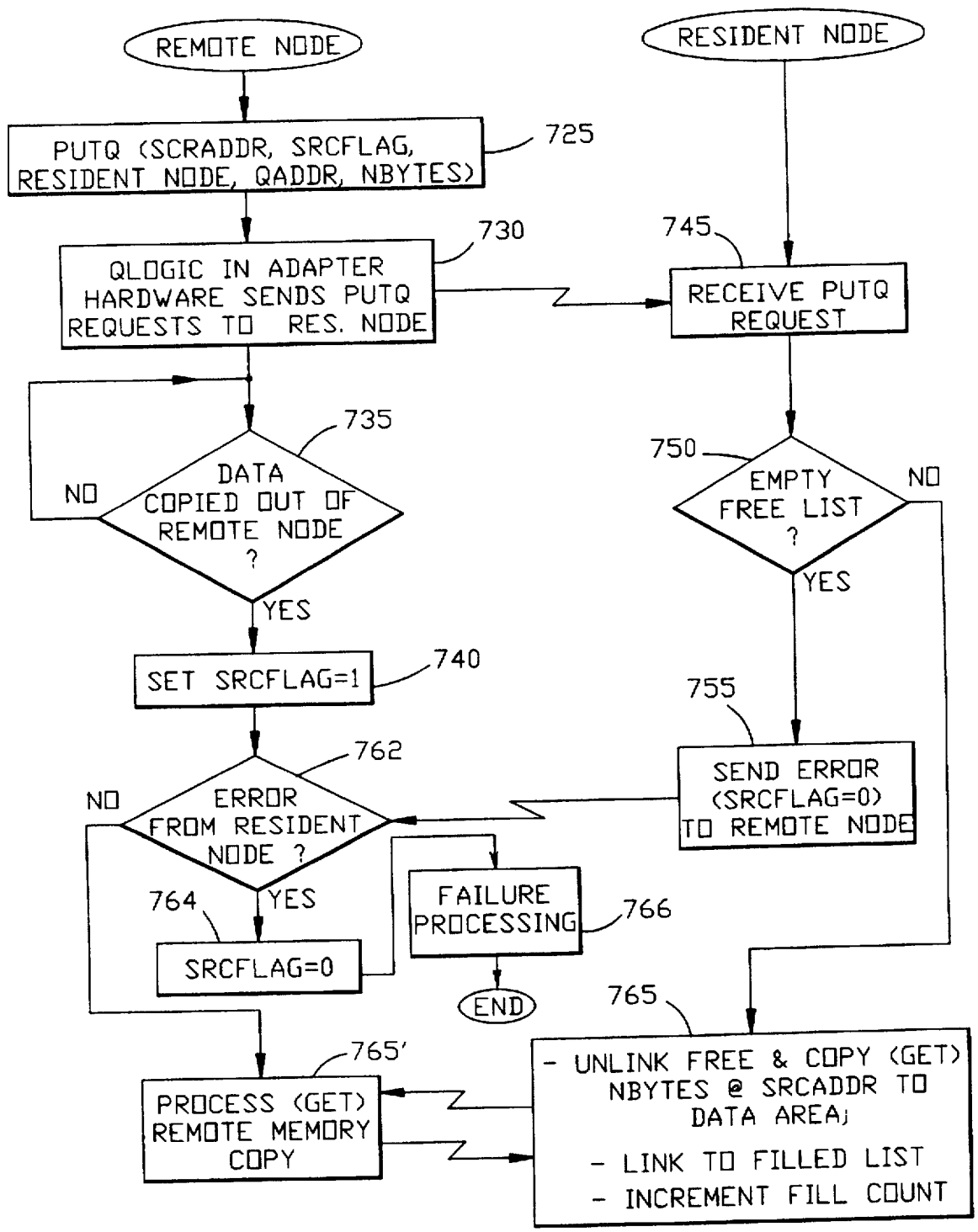
FIG. 6c shows an embodiment of a dataflow and function according to the present invention for a put queue (putq) primitive incorporated in the queue logic of the adapter hardware.

Referring now to FIG. 6a, an embodiment according to the present invention of a dataflow and function for the qlogic 410 implemented in the adapter hardware 400 is shown. In the first step 675, a service process 500 initializes a queue by invoking the INITQ command (described with reference to FIG. 6b) which is passed to the qlogic implemented in the adapter hardware. The qlogic sets up a queue table (qtable 210) structure in the user memory 200 of the service process 500. The queue instance can then be referred to by the known address of the qtable 210 structure. The service process communicates this address to relevant client processes through means well known in the art and therefore not described here. A node 100 associated with the service process 500 will be also referred to as a resident node 100' for this queue structure. In step 680, a client process (executing asynchronously on a remote node 100") wishing to submit a request invokes a PUTQ 650 operation (described with reference to FIG. 6c). The qlogic on the remote node 100" communicates the PUTQ operation to the appropriate resident node 100'. In step 685, qlogic 410 in the resident node 100' enqueues the request in the qtable 210 previously instantiated in the program memory 200 of the resident node 100'. In step 690, the service process picks up one request at a time from the queue by invoking a GETQ 620 operation of the qlogic 410 (described with reference to FIG. 6d) . The QSIZE 640 operation of the qlogic 410 can be used by the service process to predetermine whether qtable 410 has entries, before invoking a getq operation. Those skilled in the art will appreciate that within the scope of the present invention a node may be a resident node 100' for a given qtable 210 and simultaneously be a remote node 100" for a given mtable 240 (described below). Similarly, one node may be a resident node 100' for a qtable 210 initialized by one service process and a remote node 100" with respect to another qtable initialized by a process and resident on another node.

The qtable 210 according to the present invention encodes the entire state of a queue so that the qlogic 410 in the adapter hardware 400 is memory-less. The qlogic 410 simply manipulates the qtable structure when a command, e.g., PUTQ is received. This feature of the present invention advantageously provides scalability as the system expands.

As shown in FIG. 2, the qtable 210 structure resides in the memory 200 at the node 100 from which a process 500 invokes the initq 610 command. This is called the resident node 100'. The processor at the resident node 100' can issue any of the operations getq 620, retq 630 and qsize 640. The associated processors for a given process, at other nodes (called remote nodes 100") can issue only the putq 650 operation on that queue. It is assumed that the resident node 100' communicates with the relevant remote nodes informing them of the address of the queue structure that is created.

As noted above, according to an embodiment of the present invention, queues are manipulated by the qlogic 410 implemented in adapter hardware. Preferably, the qlogic 410 implements the 5 primitives initq 610, getq 620, retq 630, qsize 640 and putq 650. Each of them is now described.

FIG. 6b shows an embodiment of a dataflow and function according to the present invention for an initq primitive incorporated in the qlogic 410 of the adapter hardware 400. A process 500 may instantiate a qtable 210 by invoking the initq(qaddr, n, itemsize) primitive 610 in the qlogic 410. Here, the parameter n is the maximum number of entries in the queue, each of size itemsize. The initq operation is passed to the qlogic 410 which is implemented, by means well known in the art, in the adapter hardware 400 to responsively perform the functions shown in FIG. 6b. Specifically, in step 700, the memory 200, starting at qaddr is allocated to store the qtable 210. In step 705, the qtable header 220, and qtable item lists 230 may be set up as shown in FIG. 3. The space for the items may be organized to form two logical linked lists of qtable items 230: a free list and a filled list. The header 220 for the qtable 210 contains pointers 222 and 223 respectively, to these two linked lists. The filled list contains all the items that are currently in the queue. In step 710, the filled list will be initialized as empty; the fill count 221 is set to zero; and the free ptr 222 and fill ptr may be initialized to point to their respective lists. The free list may contain dummy items that will be used to fill subsequent incoming items. In step 715, all the items will be initially linked into the free list.

Referring now to FIG. 6c, a function and data flow embodiment according to the present invention of a put queue request primitive 650 implemented in the adapter hardware 400 is shown. As for the initq primitive, the putq primitive is passed to the qlogic 410 which is implemented in the adapter hardware 400, by means well known in the art, to perform the functions shown in FIG. 6c. Specifically, in step 725 a remote node 100" issues a putq operation 650, with the parameters (srcaddr, srcflag, residentnode, qaddr, nbytes. In this embodiment, the srcaddr parameter contains the address of the item associated with the request; the srcflag parameter is used to indicate when data has been copied from the remote node 100"; the residentnode parameter identifies the resident node 100' associated with the target qtable 210; the qaddr parameter contains the address of the target qtable 210; and the nbytes parameter contains the number of bytes of the item associated with the request. Referring again to FIG. 6c, the qlogic 410 in the adapter at the remote node 100" does the following: In step 730, the adapter 400 sends the putq request to the appropriate resident node 100'. In step 735, if the data is successfully copied out of the remote node 100", the srcflag is set to 1, in step 740. In step 745, the residentnode receives the putq request 650. In step 750, the qlogic checks if the free list is empty; if not, then in step 765 it unlinks an item from the free list 222; and in step 765', remotely copies by means well known in the art, e.g., by a get 604 command, nbytes of data at srcaddr in the program memory 200 of the remote node 100" into the data area 231 of the unlinked item in the resident node 100' and the bytes 232 field is updated with nbytes; the nextptr 233 field is updated and the copied data linked into the filled list 223; and the fill count 221 is incremented. In step 750, if the free list is empty, then in step 755, the resident node 100' may process the error by setting the srcflag=0 and transmitting the error to the remote node 100" for failure processing, by means well known in the art, as shown in steps 762–764–766.

Figure 6D:
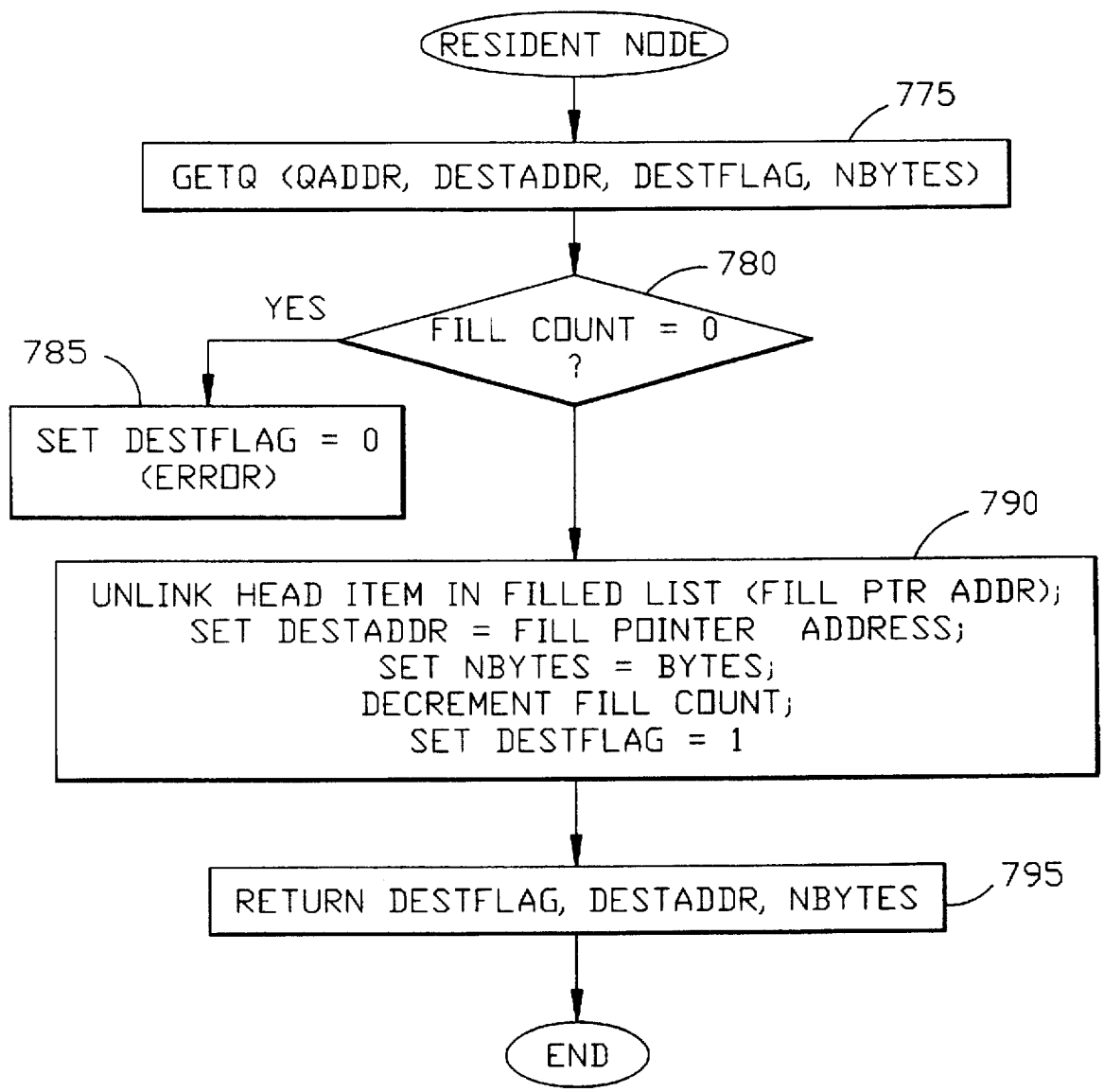
FIG. 6d shows an embodiment of a dataflow and function according to the present invention for a get queue (getq) primitive incorporated in the queue logic of the adapter hardware.

Referring now to FIG. 6d, an embodiment according to the present invention is shown of a dataflow and function for a getq primitive incorporated the adapter hardware 400. The getq primitive may be used by a process 500 to retrieve the head item from a queue table 210 stored in user program memory 200 at address qaddr. Specifically, in step 775 a residentnode process issues a getq operation 620, with the parameters (qaddr, destaddr, destflag, nbytes). Here, the destaddr and nbytes parameters are return parameters which indicate the address and size, respectively, of the head qtable item 230. In step 780, the filled count 221 of the queue identified by qaddr is checked. If it is empty (fill count=0), then in step 785, the destflag is set to an error value (destflag=0) for processing upon return, in step 795. Otherwise, in step 790: the head item in the filled list 223 is unlinked; the return parameter destaddr is set to the address of the unlinked item; the filled count 221 is decremented; the return parameter nbytes is set to (the number of) bytes 232 of the unlinked item; and the return parameter destflag is set to 1. Preferably, the unlinked item is not used until it is returned explicitly, in step 795.

Figure 6E:
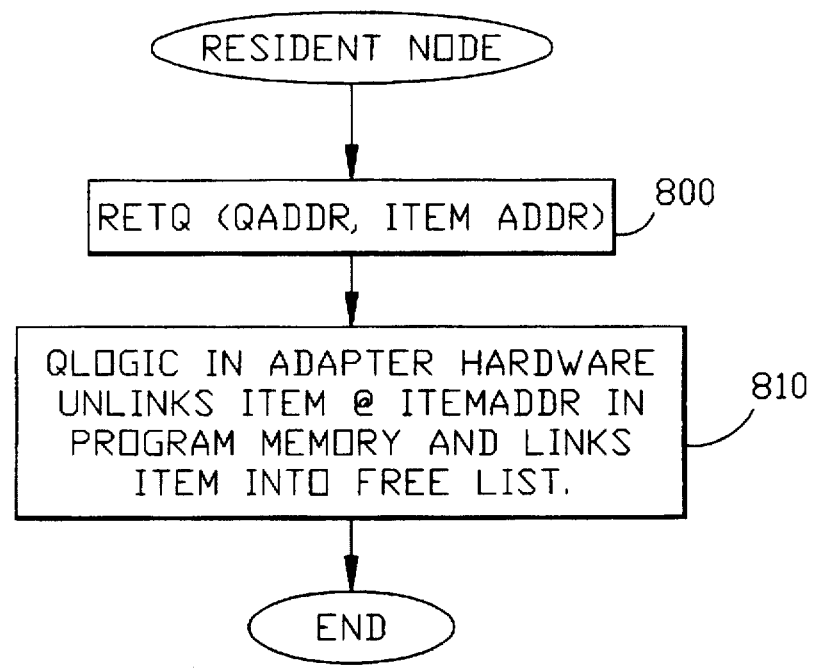
FIG. 6e shows an embodiment of a dataflow and function according to the present invention for a return queue (retq) primitive incorporated in the queue logic of the adapter hardware.

Referring now to FIG. 6e, an embodiment according to the present invention is shown of a dataflow and function for a retq primitive 630 incorporated the adapter hardware 400. The retq primitive may be used by a process 500 to return an item from the filled list 223 stored in user program memory 200 at address qaddr to the free list 222. Specifically, in step 800, a resident node process 500 issues a retq operation 630, with the parameters (qaddr, itemaddr). In step 810, the qlogic 410 in the adapter hardware 400 unlinks an item from the filled list 223 at address qaddr in program memory 200 and links the item to the free list 222.

Figure 6F:
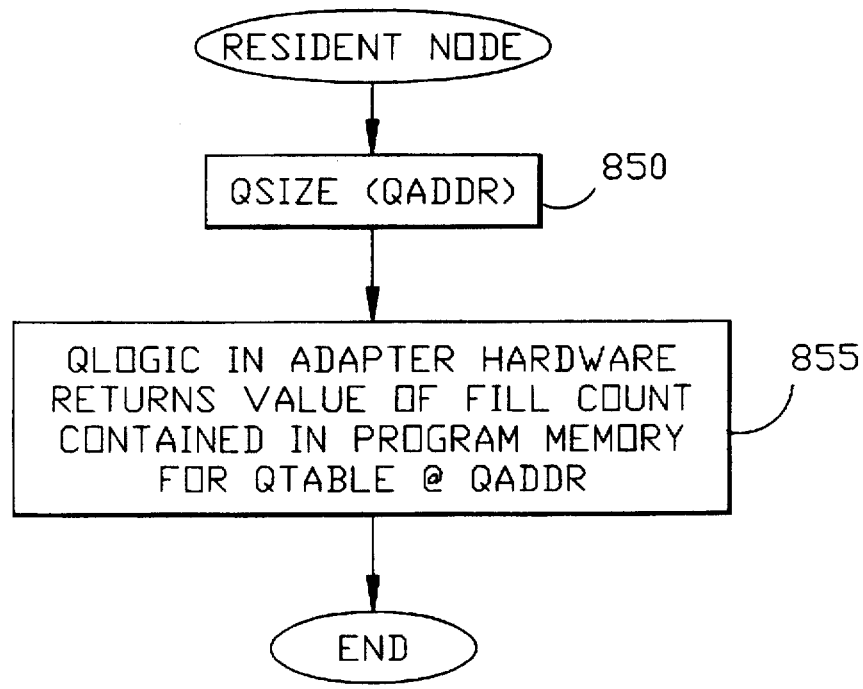
FIG. 6f shows an embodiment of a dataflow and function according to the present invention for a queue size (qsize) primitive incorporated in the queue logic of the adapter hardware.

Referring now to FIG. 6f, an embodiment according to the present invention is shown of a dataflow and function for a qsize primitive 640 incorporated the adapter hardware 400. The retq primitive may be used by a process 500 to obtain the value of the fill count 221 for a qtable 230 at address qaddr. Specifically, in step 850, a resident node process 500 issues a qsize operation 640 with the parameter (qaddr). In step 855, the qlogic 410 in the adapter hardware 400 processes the command and returns the value of the fill count 221 in the header 220 of the qtable 210 (at address qaddr) in program memory 200.

By way of overview and with reference to the embodiment according to the present invention shown in FIG. 2, a match table (mtable 240) maintained in a service process 500 user memory 200 may be used by communicating service and client processes by employing user-defined criteria to specify the process requests. Typically, a service (resident node 100') process issues a message specifying the kind of request that will be serviced. This is advantageously accomplished by mlogic 440 in the adapter hardware 400 responsively putting an entry in the mtable 240. Similarly, a client (remote node 100") process communicates a message, via its mlogic 440, to the service node specifying the nature of the process request it has. The mlogic at the service node also causes the remote node 100" request to be entered into the mtable 240. When the mtable 240 contains matching entries, they are retrieved and given to the service process which then takes steps to process the request. Two mtable items 260 are said to match if the key 265 of one item matches with the pattern 264 of the other item, as defined above in an embodiment of the present invention previously described with reference to FIG. 4a.

Figure 7A:
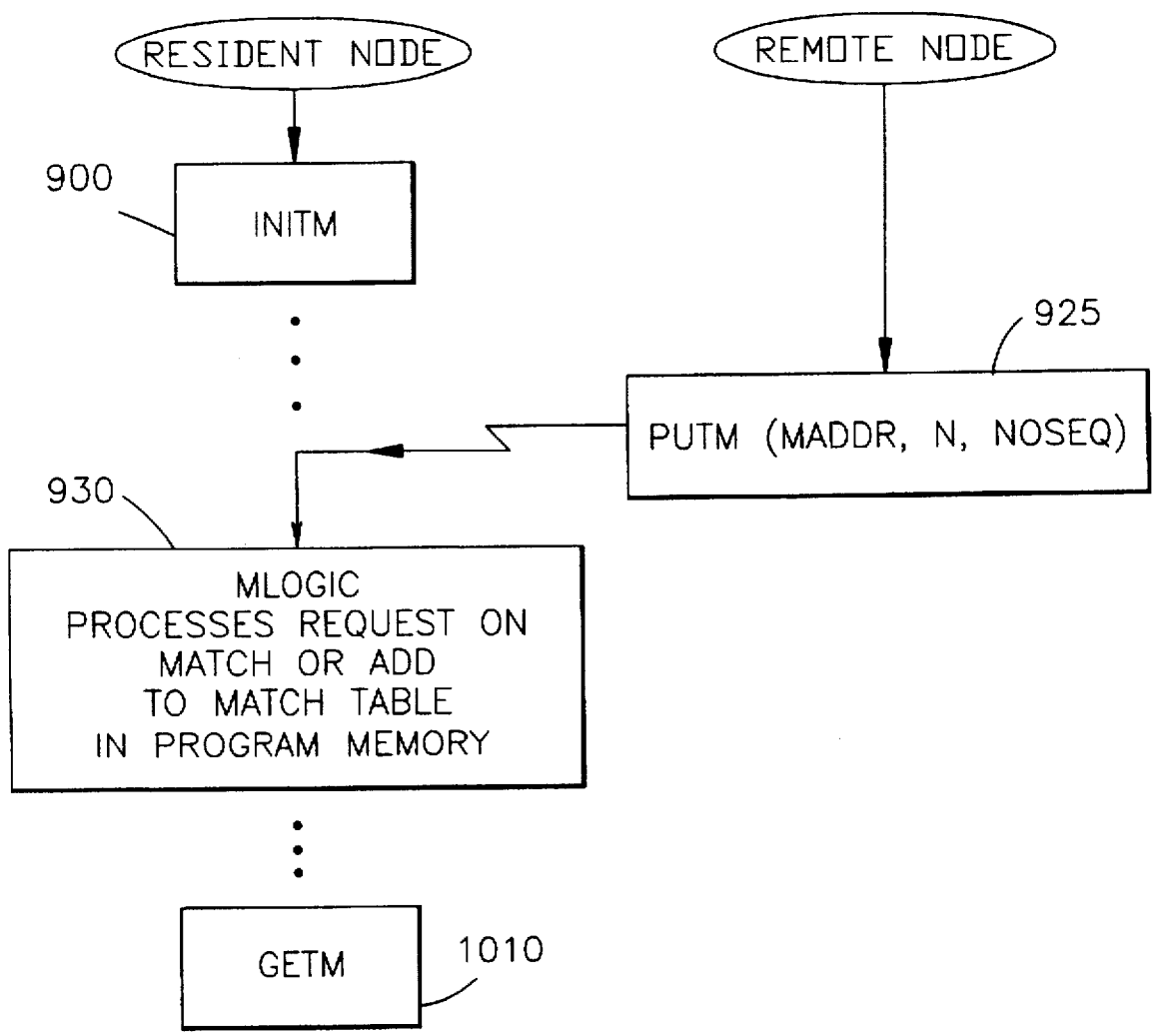
FIG. 7a shows an embodiment according to the present invention of a dataflow and function for a match logic implemented in the adapter hardware.

FIG. 7a shows an embodiment of a dataflow and function according to the present invention for match logic (mlogic 410) implemented in the adapter hardware 400 and an associated match table (mtable 240) stored in program memory 200. In step 900, a service (resident node 100') process 500 instantiates an mtable 240 by communicating an INITM 660 (described with reference to FIG. 7b) command to the mlogic 410 in the adapter hardware 400. The mlogic 440 causes the necessary table structure 240 to be set up in the program memory 200 of the service (resident node 100') process. The service process communicates the table address to relevant client processes through means well known in the art and thus not described here. The match table instance can thus subsequently be referred to by the address of the table structure. Asynchronously, in step 925, a client (remote node 100") process wishing to submit a request communicates a PUTM 680 (described with reference to FIG. 7c) operation from the mlogic in its adapter to the mlogic 410 in the adapter hardware 400 of the appropriate resident node 100'. In step 930, if the resident node 100' has put an item in the match table which indicates that it will process a request of the type submitted by the remote node 100", the request will be processed. If no matching request is found, the mlogic 440 at the resident node 100' causes the request to be put in the mtable 240 previously initialized by the service (resident node 100') process. Finally, in step 1010, the service (resident node 100') process picks up one request at a time from the match table by communicating a GETM 670 operation (described with reference to FIG. 7d) to the mlogic 410 in the adapter hardware 400.

The match tables preferably encode the entire state of a match table so that the adapter hardware is memory-less. The mlogic simply manipulates the table structure when a command is issued. This feature of the present invention advantageously provides a communications adapter which is scalable as the system expands. As shown in FIG. 2, an embodiment of an mtable 240 according to the present invention preferably resides in the memory 200 at the node from which the processor invokes the INITM 660 command. This is called the resident node 100'. A destitem hereinafter refers to an mtable item 260 (as shown in FIGS. 4 and 4a) originating from a service (resident node 100') process while an srcitem hereinafter refers to an mtable item 260 originating from a client (remote node 100") process.

Those skilled in the art will appreciate that within the scope of the present invention a node may be a resident node 100' for a given mtable 240 and simultaneously be a remote node 100" for a qtable 210 residing on another node. Similarly, one node may be a resident node 100' for an mtable 240 initialized for one service process and a remote node 100" with respect to an mtable 240 initialized by a process on another node.

As shown in FIG. 2, the processor at the resident node 100' can issue the initm 660, and getm 670 operation and any other (remote) processor can issue the putm 680 operation. The match logic (mlogic 440), which manipulates the match table (mtable 240) in program memory 200, preferably implements the 3 primitives initm 660, getm 670 and putm 680 in the adapter hardware 400. Each of the primitives is now described.

Figure 7B:
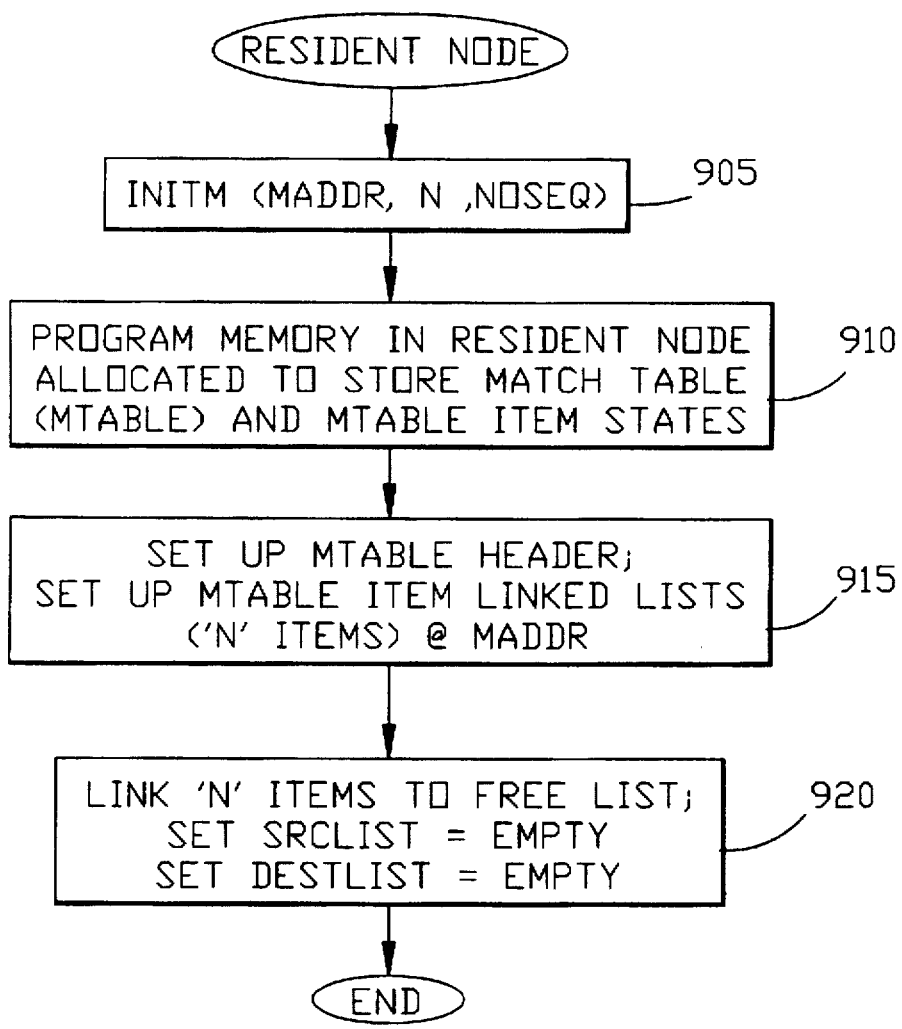
FIG. 7b shows an embodiment of a dataflow and function according to the present invention for a match table initialization (initm) primitive incorporated in the match logic of the adapter hardware.

FIG. 7b shows an embodiment of a dataflow and function according to the present invention for an initm primitive incorporated in the mlogic 440 of the adapter hardware 400. A process 500 may instantiate a n mtable 240 by communicating an initm(maddr, n, noseq) command 660 to the mlogic 440. The mlogic 440 is implemented, by means well known in the art, in the adapter hardware 400 to responsively perform the initm functions shown in FIG. 7b. Here, the parameter n specifies the maximum number of entries in the table. The parameter noseq specifies that no sequencing is implied here (as opposed to a sequence table to be described later). Specifically, in step 905 the initm command is communicated to the qlogic causing the following actions to take place. In step 910, the memory starting at maddr is used to set up the mtable header 250 and item lists 260. In step 915, the space for the items is organized to form three logical linked lists of mtable items 260: a free list pointed at by free ptr 251; a srclist pointed at by src ptr 252; and a dest list pointed by dest ptr 253. In step 920, all items may be initially linked into the free list and the other two lists may be set to empty.

Figure 7C:
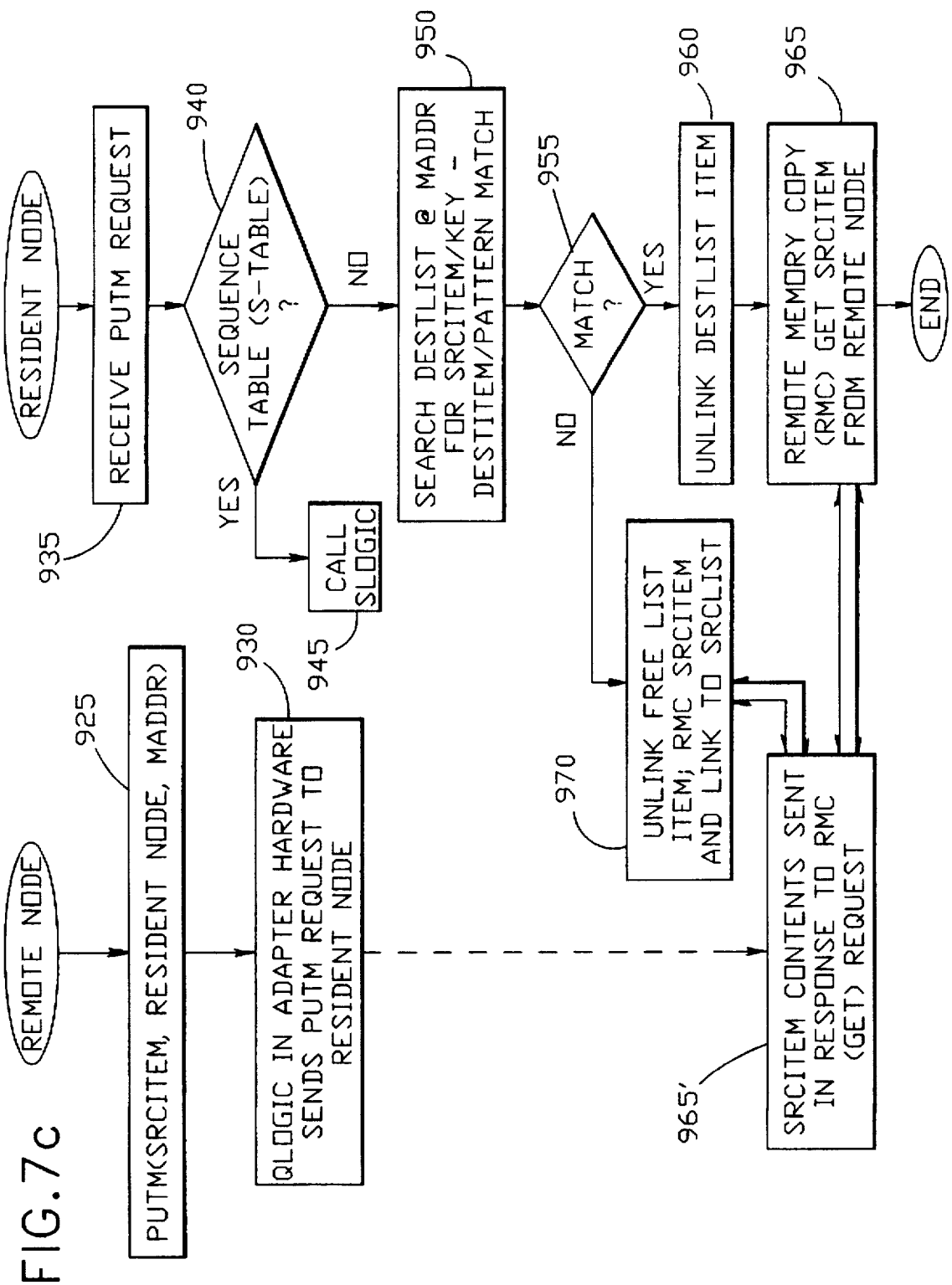
FIG. 7c shows an embodiment of a dataflow and function according to the present invention for a put match (putm) primitive incorporated in the match logic of the adapter hardware.

FIG. 7c shows an embodiment of a dataflow and function according to the present invention for a putm primitive incorporated in the mlogic 440 of the adapter hardware 400. A client (remote node 100") process 500 may communicate a putm command to a service (resident node 100') process which will process the request as a function of user-specified matching criteria. The mlogic 440 is implemented, by means well known in the art, in the adapter hardware 400 to responsively perform the putm functions shown in FIG. 7c. Specifically, in step 925 a remote node 100" process communicates a putm(srcitem, residentnode, maddr) command to the mlogic in the remote node 100" adapter hardware 400. Recall that the srcitem parameter preferably has the structure of an mtable item 260. The residentnode parameter identifies the node 100 having the relevant mtable structure 240 in program memory 200 at the address specified by the maddr parameter. In step 930, The mlogic 440 in the adapter hardware at the remote node 100" communicates the putm request to the resident node 100'. In step 935, the appropriate resident node 100' receives the putm request. In step 940, a sequencing option of the request is examined. If sequencing is specified (e.g., by an s parameter), the request proceeds with step 945, which will be described later with reference to FIG. 7g. In this case, however, sequencing has not been specified and step 950 is performed in which the destlist 253 for the mtable 240 associated with address maddr is searched for a destitem which matches the srcitem according to the criterion previously described with reference to FIG. 4a. Recall that a destitem refers to an mtable item 260 (as shown in FIGS. 4 and 4a) originating from a service (resident node 100') process. In step 955, if a matching destitem is found, then step 960 is executed in which the matched item is unlinked from the destlist 253. In steps 965 and 965', a get command may be used to remotely copy the srcitem data (at buffer addr 262 specified in srcitem) from the remote node 100" to the residentnode (at buffer addr 262 specified in the matched item) . The number of bytes transferred is specified by bytes 256 in srcitem. The matched item is then linked into the free list 251 at the resident node 100'. If, in step 955, no matching item is found, step 970 is executed in which a free item is unlinked from the free list 251 at the resident node 100'; the contents of srcitem are remotely copied from the remote node 100", as above into the unlinked item at the resident node 100'. The unlinked item is then linked into the srclist 252 at the resident node 100'.

Figure 7D:
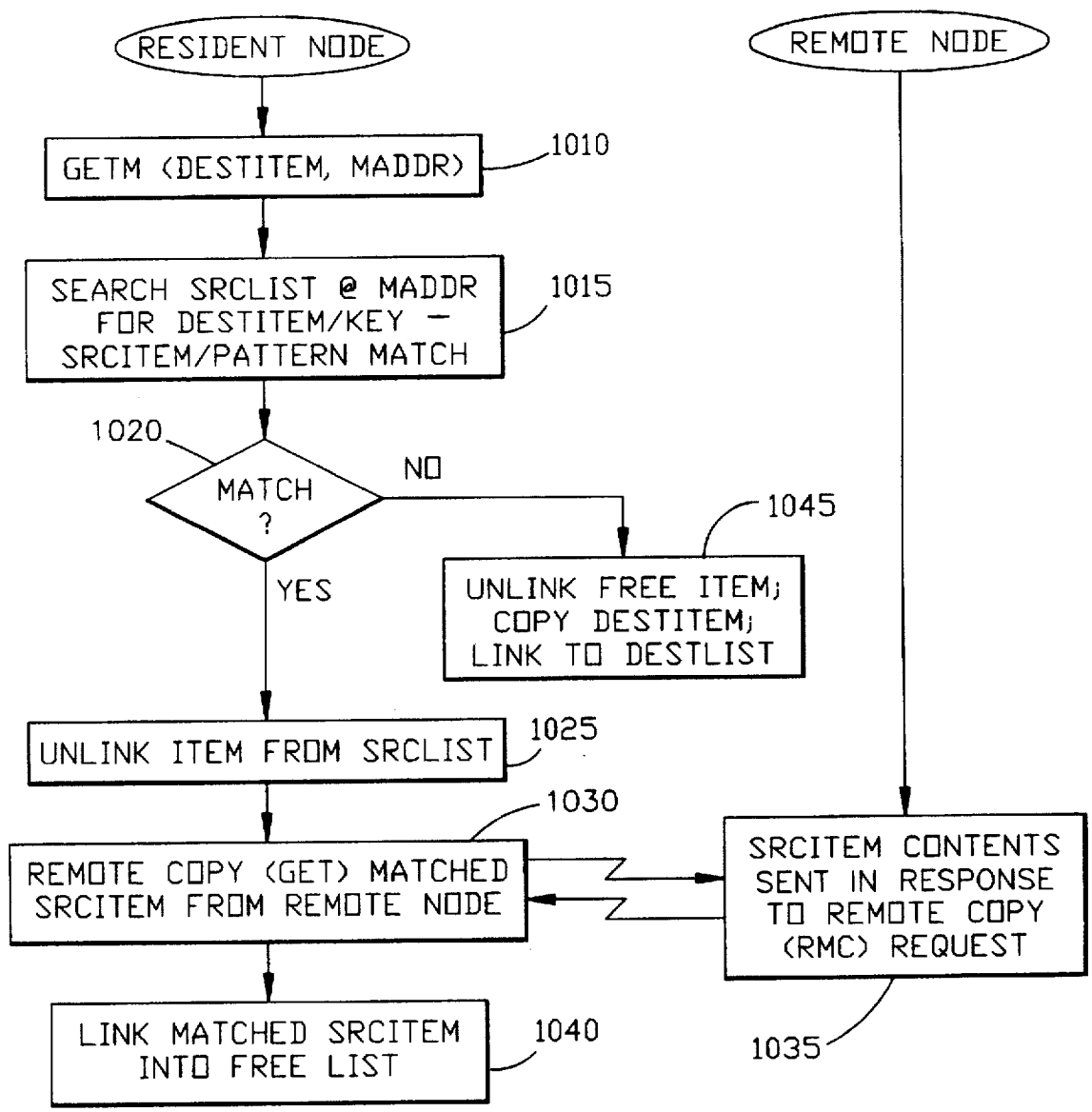
FIG. 7d shows an embodiment of a dataflow and function according to the present invention for a get match (getm) primitive incorporated in the match logic of the adapter hardware.

FIG. 7d shows an embodiment of a dataflow and function according to the present invention for a getm primitive incorporated in the mlogic 440 of the adapter hardware 400. A service (resident node 100') process 500 may communicate a getm command to the mlogic 440 (in the resident node adapter 400) which will then process the request as a function of user-specified matching criteria. The mlogic 440 is implemented, by means well known in the art, in the adapter hardware 400 to responsively perform the getm functions shown in FIG. 7d. Specifically, in step 1010, a resident node 100' issues a getm(destitem, maddr) operation 670 where the destitem refers to an mtable item 260 in the destlist 253 of an mtable 240 at address maddr. In step 1015, the mlogic 440 searches the src list 252 for the match table pointed associated with address maddr, to see if it has an mtable item 260 that matches the destitem, according to the matching criterion as described with reference to FIG. 4a.

Returning to FIG. 7d, in step 1020, if a matching mtable item 260 is found in the src list 252, the matched item is unlinked from the src list 252, in step 1025. In steps 1030 and 1035 a get operation may be used to remotely copy the srcitem data from the remote node 100", (specified by the processor number (pe 261) in the matched srcitem) at the buffer addr 262 specified in matched srcitem, to the resident node 100' (at buffer addr 262 specified in the destitem). The number of bytes transferred may be specified by bytes 266 in the matched srcitem. In step 1040, the matched item is linked into the free list 251 at the resident node 100'.

In step 1045, if no matching item is found, a free item is unlinked from the free list 251 at the resident node 100', the contents of destitem are copied into the unlinked item and the unlinked item is then linked into the destlist (253) at the resident node 100'.

Figure 7E:
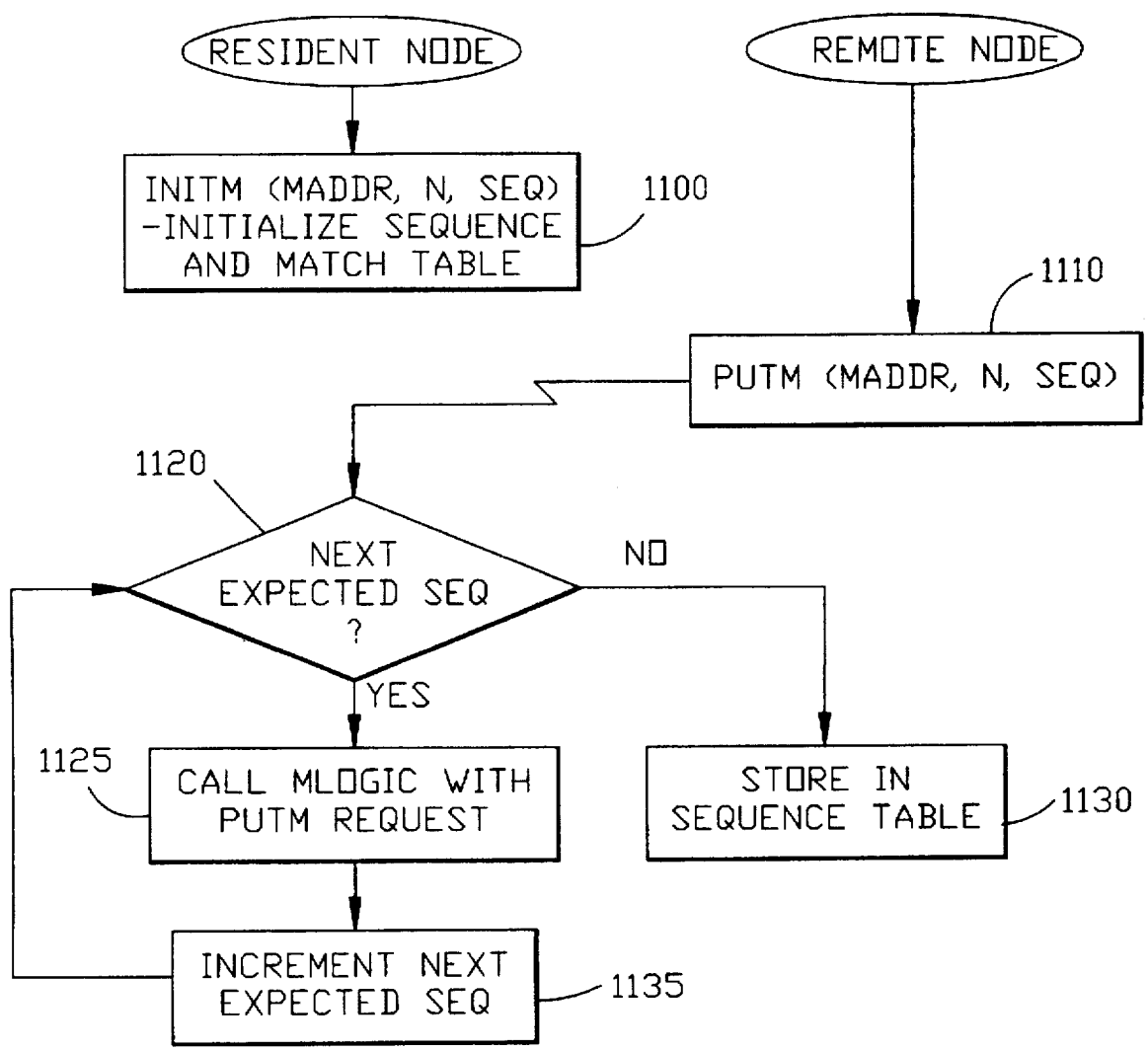
FIG. 7e shows an embodiment of a dataflow and function according to the present invention for sequence table logic (slogic) implemented in the adapter hardware.

FIG. 7e (to be described later) shows an embodiment of a sequence table mechanism, or slogic 470, incorporated in the adapter hardware 400, according to the present invention for enforcing sequencing. By way of overview, in message passing systems, a service process often requires that requests submitted by each processor must be considered for service in the order submitted. For example, if client process submits sequential requests A,B, and C, the service process must see them in that order. However, the interconnection network does not guarantee sequential message delivery. Hence they may be delivered to the service process non-sequentially which violates the semantics of message passing systems. According to an embodiment of the present invention, the sequence table (s-table 270) itself preferably resides in the program memory 200 of the service (resident node 100') process. The slogic 470 manipulates the sequence table to store any messages arriving from a remote node 100" out of sequence and subsequently delivers them to the service process in their expected sequential order. Preferably, the remote node 100" maintains the sequence numbering, e.g., starting at 1 and incrementing by one each time it issues a putm operation for a given match table.

Recall that FIG. 5 shows a structure of a version of a sequence table according to the present invention. The sequence table header 271 includes a pointer to a list of peitems 280, linked by the next peitem ptr 284. Each peitem 280 corresponds to a node indicated by the pe 281 number. It also contains the next sequence number 282 expected from that node and a seq item ptr which points to a list 283 of seq items 290 received from that node that have sequence numbers greater than the next seq 282 number. Each seq item 290 contains the sequence number (seq num) 291 and the corresponding putm request item 292 received from that node 281.

FIG. 7e shows an embodiment of a dataflow and function according to the present invention for sequence table logic (slogic 470) implemented in the adapter hardware 400 and an associated sequence table (s-table 270) stored in program memory 200. In step 1100, a service (resident node 100') process initializes a sequence table by invoking the INITM command, with a sequencing identifier, e.g., option "SEQ" (described with reference to FIG. 7f), which is passed to the slogic in the adapter hardware 400. The slogic causes both an mtable 240 and a sequence table (s-table 270) structure to be set up in the program memory 200 of the service process. The match and sequence table instances can then be referred to by the known addresses of the table structures. These tables are preferably marked to indicate that a sequencing option is in place for them. The service process communicates this address to relevant client processes through other means well known in the art and thus not described here. Some time later, in step 1110, a client (remote node 100") process wishing to submit a sequenced request sends a PUTM command as described above along with a sequence number, (described with reference to FIG. 7g) to its slogic 470. In step 1120, the sequenced PUTM request is communicated to the slogic at the appropriate resident node 100'. In step 1125, if the request is in the expected sequence it is processed immediately, in step 1125, by invoking a PUTM command to the above described mlogic 400 and mtable 240. Otherwise, in step 1130, the request is put into the sequencing table for processing according to its expected sequence. In step 1135, the service process increments its next expected sequence number and loops back to step 1120 to process any other requests previously stored in the sequence table, e.g., as a result of step 1130, but which now are in their expected sequence.

The sequence tables encode the entire state and the adapter is memoryless. The slogic 470 simply manipulates the s-table 270 structure when a command is issued. This makes the adapter hardware scalable as the system expands.

Those skilled in the art will appreciate that within the scope of the present invention a node may be a resident node 100' for a given s-table 270 and simultaneously be a remote node 100" for a qtable 210 or an mtable 240 residing on another node. Similarly, one node may be a resident node 100' for an s-table 270 initialized for one service process and a remote node 100" with respect to an s-table 270 initialized by a process on another node.

Figure 7F:
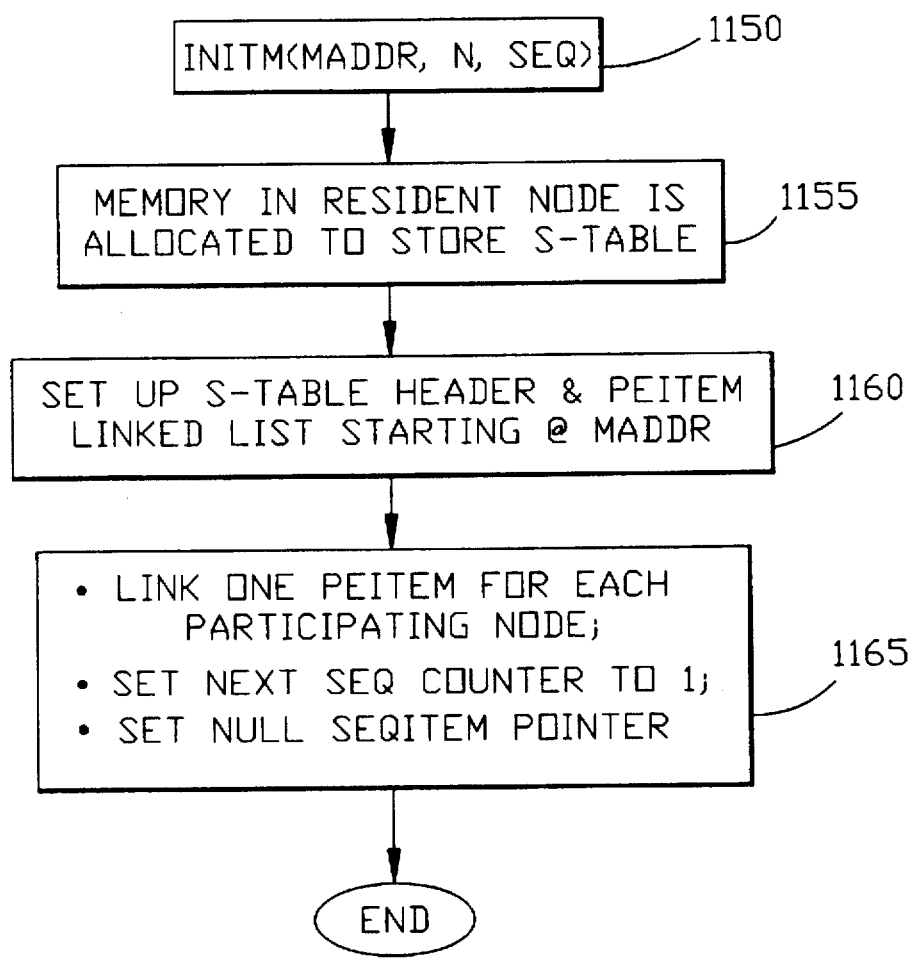
FIG. 7f shows an embodiment of a dataflow and function according to the present invention for a sequence table initialization (initm) primitive incorporated in the sequence table logic (slogic) of the adapter hardware.

FIG. 7f shows an embodiment of a dataflow and function according to the present invention for an initm primitive incorporated in the slogic 470 of the adapter hardware 400. The slogic 470 is implemented, by means well known in the art, in the adapter hardware 400 to responsively perform the initm functions shown in FIG. 7f. Specifically, in step 1150, a process 500 may instantiate an s-table 270 by communicating an initm(maddr, n, seq) command 660 to the slogic 470. The parameter 'seq' specifies that sequencing is implied here. Note that the slogic also causes an mtable 240 structure to be set up in the program memory 200 of the service process. The match and sequence table instances can then be referred to by the known addresses of the table structures. These tables are preferably marked to indicate that a sequencing option is in place for them. In step 1155, program memory 200 in the resident node 100' is allocated to store the s-table Header 271 and peitem 280 list. In step 1160, the memory at maddr is used to set up the header 271 and peitem list. In step 1165, the peitem list 271 will preferably contain one peitem for each participating node; the next seq 282 counter is set to some initial value, e.g., 1; and the sequential item pointer (seqitem ptr 283) which points to the seq item list 290 for this processor (pe 261') is initialized, e.g., as null.

Figure 7G:
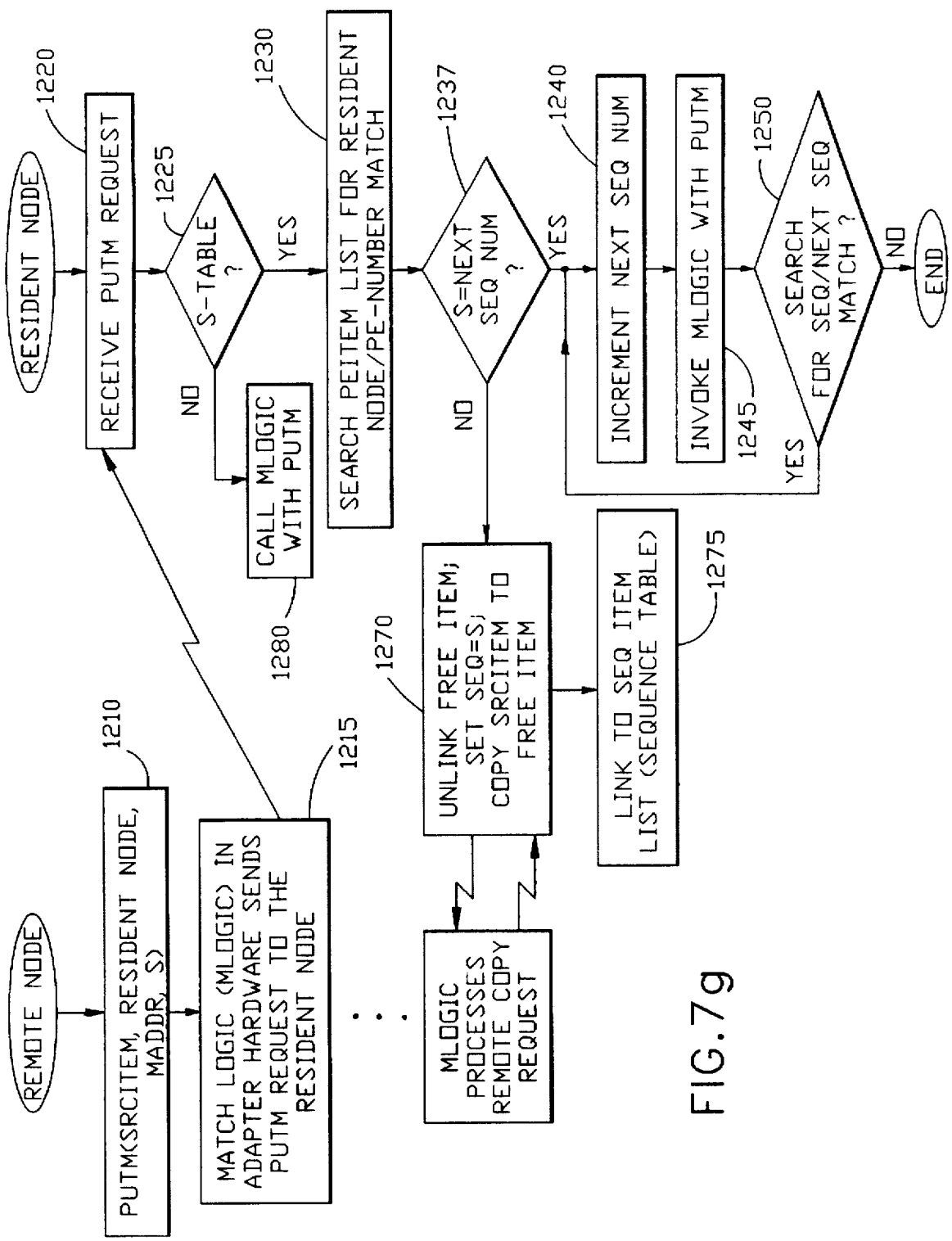
FIG. 7g shows an embodiment of a dataflow and function according to the present invention for a put match (putm) primitive incorporated in the sequence table logic (slogic) of the adapter hardware.

FIG. 7g shows an embodiment of a dataflow and function according to the present invention for an putm primitive incorporated in the slogic 470 of the adapter hardware 400. The slogic 470 is implemented, by means well known in the art, in the adapter hardware 400 to responsively perform the initm functions shown in FIG. 7g. Specifically, in step 1210, a remote node 100" issues a putm(srcitem, residentnode, maddr, s) operation 680, with the sequencing option being indicated by the parameter s, which preferably indicates the relative sequential order of this request. The remaining parameters have the same meaning as discussed with reference to FIG. 7c. In step 1215, the request is sent to the resident node 100'. In step 1220, the resident node 100' receives the putm request. In step 1225, the slogic 470 in the resident node 100' determines that this is an ordered request. In step 1230, the the peitem list 271 is searched and the peitem 280 whose pe 281 field is associated with the resident node 100' is identified.

In step 1237, the next seq 282 is compared with the contents of the 's' parameter. If, in step 1237, the next seq no 282 is less than the value of the parameter s, then in step 1270, a free seq item 290 is unlinked, and the seq 291 in it is set to the value of s; the srcitem is copied into the item 292. In step 1275, the unlinked seq item 290 is then linked to the list pointed at by the next item ptr 293 in the seq item 290. If in step 1237, the values of the next seq 282 and the parameter s are equal, then step 1240 is executed in which the next seq 282 is incremented. In step 1245, the slogic 470 invokes the mlogic 440 with a putm(srcitem, residentnode, maddr) operation for processing as discussed with reference to FIG. 7c. In step 1250, the seq item list associated with this pe 261' is searched for a request having an seq 291 equal to the incremented next seq 282 (from step 1240). This may be done to process requests which were previously put into the s-table, e.g., because they arrived at the resident node 100' ahead of the next expected request. If a match is found, the matched seq item 290 is unlinked from the seq item list 283, and the process repeats with step 1240.

Now that the invention has been described by way of the preferred embodiment, various modifications and improvements will occur to those of skill in the art. Thus, it should be understood that the preferred embodiment has been provided as an example and not as a limitation. The scope of the invention is defined by the appended claims.

What is claimed is:

1. In a distributed parallel computer network including a plurality of nodes, each node including a non-shared program memory coupled to a memoryless communications adapter which interfaces the network, a communications adapter-based method for communicating between the nodes, comprising the steps of:

executing a process in parallel on a plurality of the nodes;

issuing a queue table initialization request from the process in a resident node to a queue logic incorporated in hardware of the memoryless communications adapter in the resident node and the queue logic instantiating, responsive to the queue table initialization request, a queue table for storing a plurality of data identifiers in the program memory of the resident node;

communicating a put queue request which includes a data identifier from the queue logic in a remote node to the queue logic in the resident node, and remotely copying, responsive to the put queue request, a data item associated with the put queue request from the program memory in the remote node to the queue table; and issuing a get queue request from the process in a resident node to the queue logic in the resident node and the queue logic in the resident node retrieving the data item associated with the get queue request from the queue table.

2. In a distributed parallel computer network including a plurality of nodes, each node including a non-shared program memory coupled to a memoryless communications adapter which interfaces the network, a communications adapter-based method for communicating between the nodes, comprising the steps of:

a) executing a process in parallel on a plurality of the nodes;

b) issuing a match table initialization request from the process in a resident node to a match logic incorporated in hardware of the memoryless communications adapter in the resident node and the match logic instantiating, responsive to the match table initialization request, a match table for storing a plurality of data identifiers in the program memory of the resident node;

c) communicating a put match request which includes a data identifier and a key from the match logic in a remote node to the match logic in the resident node, and the match logic in the resident node searching the match table for a matching data identifier as a function of the key;

d) when said step of searching the match table is successful, remotely copying data associated with the data identifier from the program memory in the remote node to the program memory in the resident node;

e) when said step of searching the match table is unsuccessful, storing the data identifier and the key in the match table.

3. The method of claim 2, further comprising the steps of:

f) issuing a get match request including a data identifier and a key from the process in a resident node to the match logic in the resident node;

g) the match logic searching the match table for a matching data identifier as a function of the key, responsive to said step f); and h) when said step of searching is successful, remotely copying data associated with the data identifier from the program memory in the remote node to the program memory in the resident node.

4. In a distributed parallel computer network including a plurality of nodes, each node including a non-shared program memory coupled to a memoryless communications adapter which interfaces the network, a communications adapter-based method for communicating between the nodes, comprising the steps of:

executing a process in parallel on a plurality of the nodes;

issuing a sequence table initialization request from the process in a resident node to a sequence logic incorporated in the hardware of the memoryless communications adapter in the resident node and the sequence logic instantiating, responsive to receiving the sequence table initialization request, in the program memory of the resident node a sequence table for storing a plurality of ordered data identifiers and a match table for storing a plurality of data identifiers;

communicating a put match sequence request which includes a data identifier, a node identifier, and a sequence number, from the sequence logic in a remote node to the sequence logic in the resident node and the sequence logic in the resident node searching the sequence table for the data identifier as a function of the node identifier and the sequence number; and when said step of searching the sequence table is successful, communicating a put match request, including the data identifier and a key, from the sequence logic primitive in the resident node to a match logic incorporated in hardware of the memoryless communications adapter in the resident node.

5. The method of claim 4, further comprising the steps of:

when said step of searching the sequence table is successful, incrementing a next expected sequence number in the sequence table;

searching the sequence table as a function of a sequence number identifier included with the data items therein and the next expected sequence number, in response to said step of incrementing; and when said step of searching the sequence table as a function of a sequence number identifier is successful, unlinking the data item and communicating a put match request to the match logic in the resident node.

6. The method of claim 4, in response to said step of communicating a put match request which includes a data identifier and a key, further comprising the steps of:

the match logic in the resident node searching the match table for a matching data identifier as a function of the key;

when said step of searching the match table is successful, remotely copying data associated with the data identifier from the program memory in the remote node to the program memory in the resident node;

when said step of searching the match table is unsuccessful, storing the data identifier and the key in the match table.

7. A memoryless communications adapter for communicating between nodes of a distributed parallel computer network executing a process in parallel, each node including a processor and a non-shared program memory coupled via a bus to the memoryless communications adapter which interfaces the network, said memoryless communications adapter comprising:

a snoop logic having an input and an output, the input being coupled to the bus for capturing requests issued by a local processor and forwarding the requests to an output coupled to a command queue for storing the requests;

a router logic mechanism having a router input coupled to the output of the command queue for removing the request from the input command queue and routing the request to a router output associated with the request;

a DMA engine bidirectionally coupled to the bus and to network buffers for processing respective data transfers with the program memory and the network, the DMA engine having an input coupled to a queue logic output of a queue logic implemented in hardware of the memoryless communications adapter;

the queue logic, having a queue logic input coupled to the router output, the queue logic comprising:

a put queue primitive for communicating a put queue request from the queue logic in a remote node to the queue logic in the resident node and the queue logic in the resident node copying a data item associated with the put queue request from the remote node to the queue table; and a get queue primitive for retrieving, responsive to a get queue request received from the process in a resident node, the data item associated with the get queue request from the queue table.

8. A memoryless communications adapter for communicating between nodes of a distributed parallel computer network executing a process in parallel, each node including a processor and a non-shared program memory coupled via a bus to the memoryless communications adapter which interfaces the network, comprising:

a snoop logic having an input and an output, the input being coupled to the bus for capturing requests issued by a local processor and forwarding the requests to an output coupled to a command queue for storing the requests;

a router logic mechanism having a router input coupled to the output of the command queue for removing the request from the input command queue and routing the request to a router output associated with the request;

a DMA engine bidirectionally coupled to the bus and to network buffers for processing respective data transfers with the program memory and the network, the DMA engine having an input coupled to a match logic output of a match logic implemented in hardware of the memoryless communications adapter;

the match logic, having a match logic input coupled to the router output, the match logic comprising:

a match table request primitive for instantiating a match table in the program memory of the resident node, responsive to a match table initialization request issued by the process in the resident node wherein the match table includes a plurality of data items;

a put match request primitive for communicating a put match request from the match logic in a remote node to the match logic in the resident node and the match logic in the resident node searching the match table for a data item associated with the put match request as a function of a key included with the put match request and a pattern in the match table; when said step of searching the match table for the data item associated with the put match request is successful, remotely copying the data item from the remote node to the match table;

a get match primitive for searching the match table for the data item associated with a get match request issued by the process in the resident node as a function of a key included with the get match request and a pattern in the match table; and when said step of searching the match table for the data item associated with the get match request is successful, remotely copying the data item from the program memory in the remote node to the program memory in the resident node.

9. A memoryless communications adapter for communicating between nodes of a distributed parallel computer network executing a process in parallel, each node including a processor and a non-shared program memory coupled via a bus to the memoryless communications adapter which interfaces the network, comprising:

a snoop logic having an input and an output, the input being coupled to the bus for capturing requests issued by a local processor and forwarding the requests to an output coupled to a command queue for storing the requests;

a router logic mechanism having a router input coupled to the output of the command queue for removing the request from the input command queue and routing the request to a router output associated with the request;

a DMA engine bidirectionally coupled to the bus and to network buffers for processing respective data transfers with the program memory and the network, the DMA engine having an input coupled to a sequence logic output of a sequence logic implemented in hardware of the memoryless communications adapter;

the sequence logic having a sequence logic input coupled to the router output, the sequence logic comprising:

a sequence table initialization primitive for instantiating a sequence table including a plurality of ordered data identifiers and a match table including a plurality of data identifiers in the program memory of the resident node, when the request is a sequence table initialization request;

a put sequential primitive for searching the sequence table for a data identifier as a function of a node identifier and a sequence number included with a put sequential request communicated from the sequence logic in a remote node, and when said searching the sequence table is successful, unlinking the data identifier and issuing a put match request including the data identifier and a key, from the sequence logic in the resident node to a match logic coupled thereto and incorporated in said hardware of the memoryless communications adapter in the resident node.

10. The memoryless communications adapter of claim 9, wherein the put sequential primitive further comprises:

a counter mechanism for incrementing a next expected sequence number in the sequence table, when said searching the sequence table is successful;

a next sequence search mechanism, coupled to the counter mechanism, for searching the sequence table as a function of the next expected sequence number, and when said searching the sequence table as a function of the sequence number is successful, unlinking the data identifier and communicating a put match request to the match logic.

11. The memoryless communications adapter of claim 9, wherein the match logic comprises:

a match logic primitive including:

a match search mechanism for searching the match table for a matching data identifier as a function of the key;

when said searching the match table is successful, a remote memory copy mechanism, coupled to the match logic, for remotely copying data associated with the data identifier from the program memory in the remote node to the program memory in the resident node.

12. The memoryless communications adapter of claim 11, wherein the match logic primitive comprises:

a match table storage mechanism, coupled to the match search mechanism, for storing the data identifier and the key in the match table, when said searching the match table is unsuccessful.

\* \* \* \* \*